United States Patent
Niekerk et al.

(10) Patent No.: US 6,463,798 B2
(45) Date of Patent: Oct. 15, 2002

(54) TIRE INFLATION PRESSURE MONITORING AND LOCATION DETERMINING METHOD AND APPARATUS

(75) Inventors: Jan Van Niekerk, Tempe, AZ (US); Roger St. Amand, Tempe, AZ (US); Joseph A. Uradnik, Chandler, AZ (US); Paul N. Katz, Bellaire, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 29 days.

(21) Appl. No.: 09/765,094

(22) Filed: Jan. 17, 2001

(65) Prior Publication Data

US 2002/0092346 A1 Jul. 18, 2002

(51) Int. Cl.$^7$ .......................... B60C 23/02; B60C 23/00
(52) U.S. Cl. ...................... 73/146.2; 73/146; 73/146.5; 73/146.8; 340/447; 340/442
(58) Field of Search ................ 73/146, 146.2, 73/146.3, 146.4, 146.5, 146.8; 340/447, 442, 445

(56) References Cited

U.S. PATENT DOCUMENTS

| | | | | |
|---|---|---|---|---|
| 6,087,930 A | * | 7/2000 | Kulka et al. ............... | 73/146.5 |
| 6,292,096 B1 | | 9/2001 | Munch et al. .............. | 340/445 |
| 6,304,172 B1 | * | 10/2001 | Katou et al. ................ | 73/146.5 |
| 6,175,301 B1 | * | 1/2002 | Piesinger .................... | 73/146.4 |
| 6,340,930 B1 | * | 1/2002 | Lin ............................. | 73/146.2 |
| 6,359,556 B1 | * | 3/2002 | Katou ......................... | 73/146.5 |
| 6,362,731 B1 | * | 3/2002 | Lill ............................. | 73/146.2 |
| 6,362,732 B1 | * | 3/2002 | Konchin et al. ........... | 73/146.5 |
| 6,362,733 B1 | * | 3/2002 | Momose et al. ........... | 73/146.2 |
| 6,218,936 B1 | * | 4/2002 | Imano ......................... | 73/146.5 |
| 6,369,703 B1 | * | 4/2002 | Lill ............................. | 73/146.2 |

* cited by examiner

Primary Examiner—Benjamin R. Fuller
Assistant Examiner—Andre Allen
(74) Attorney, Agent, or Firm—Baker Botts L.L.P.

(57) ABSTRACT

A wireless tire inflation pressure measurement device is used to obtain inflation pressure information for a tire of a vehicle and a signal therefrom may be used for determining the location of the tire. An identifier may be associated with the inflation pressure information for each wheel of the vehicle. Tire rotation speed may be determined by amplitude fluctuations of a radio frequency carrier from a radio frequency transmitter rotating with the wheel. Differences in wheel rotation speeds during a turn may be used in determining the location of each tire of the vehicle. An antenna may be placed on each wheel toward the outer perimeter of the wheel and connected to the radio frequency transmitter. A radio frequency identification (RFID) tag and pressure sensor may be used as the wireless tire inflation pressure measurement device and a RFID pickup coil may be provided in each wheel well for pickup of the inflation pressure signals from each RFID tag on a wheel.

39 Claims, 14 Drawing Sheets

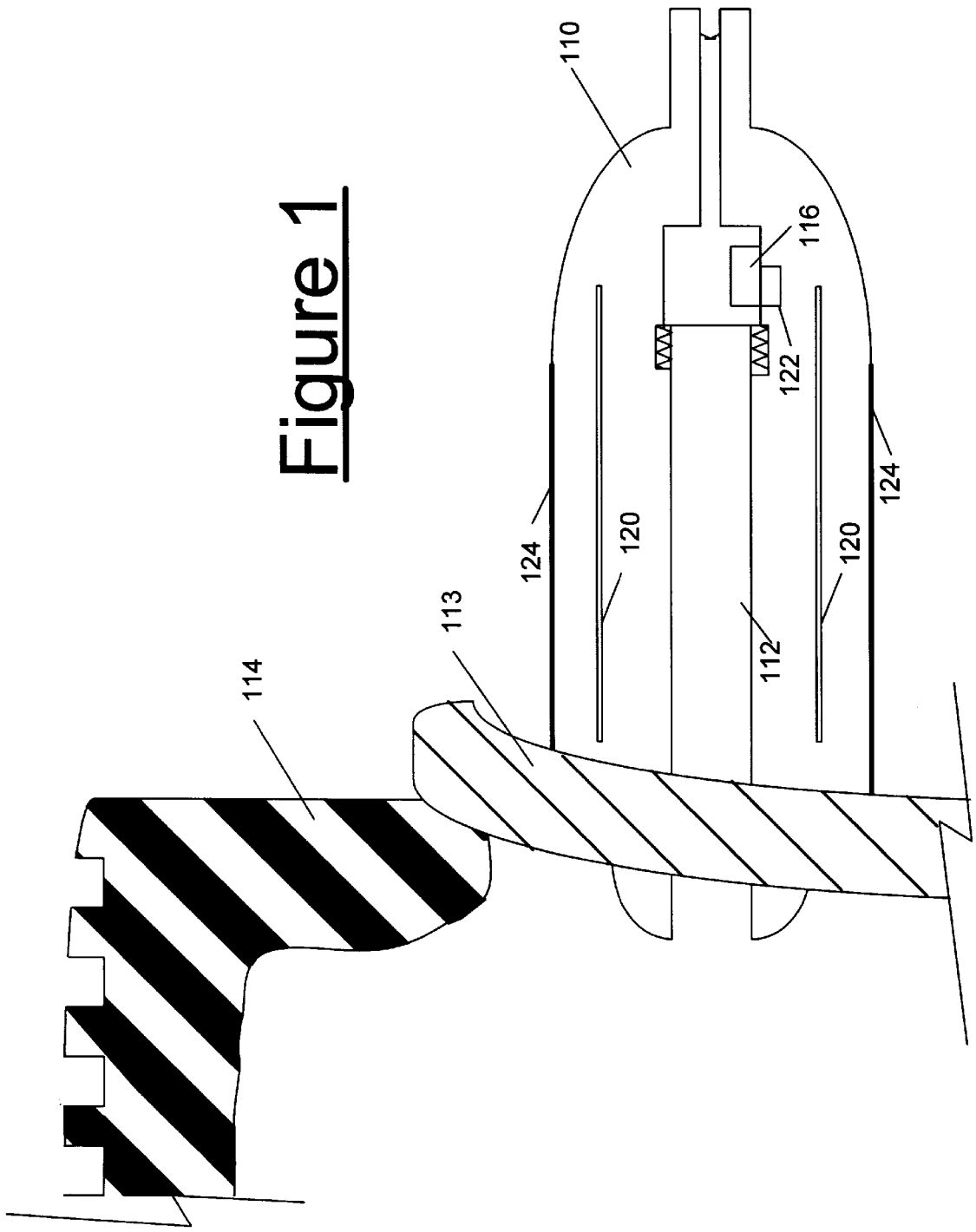

TIRE INFLATION PRESSURE MONITORING AND LOCATION DETERMINING METHOD AND APPARATUS

RELATED PATENT APPLICATIONS

This patent application is related to commonly owned U.S. patent application Ser. No. 89/765,095, entitled "Radio Frequency Identification Tag Tire Inflation Pressure Monitoring and Location Determining Method and Apparatus" by Jan van Niekerk, Roger St. Amand, Joseph A. Uradnik and Paul N. Katz; and U.S. patent application Ser. No. 09/765,093 entitled "Method and Apparatus Using Directional Antenna or Learning Modes for Tire Inflation Pressure Monitoring and Location Determination" by Jan van Niekerk, Roger St. Amand, Joseph A. Uradnik and Paul N. Katz; both applications hereby being incorporated by reference herein for all purposes.

FIELD OF THE INVENTION

This invention relates generally to tire inflation pressure monitoring, and more particularly, to wireless tire inflation pressure monitoring, tire location determination, and related secure data transfer.

BACKGROUND OF THE INVENTION

Tire inflation pressure monitoring is becoming more prevalent in all types of vehicles, such as cars, trucks, sport utility vehicles (SUVs), off-road vehicles, airplanes, motorcycles, bicycles, mobile industrial and construction equipment, and the like. Vehicle operation, safety and mileage, for example, depend on proper tire inflation pressures. When a puncture, slow leak or other low pressure condition occurs, it is advantageous to alert the vehicle operator. In addition, the newer "no flat" tires typically require attention within a certain mileage range when they lose pressure because of a puncture or other malfunction.

Tire pressure monitoring for a vehicle has been implemented in one system with a small low power transmitter and pressure sensor located on each tire. Each tire pressure sensor-transmitter sends its respective tire pressure to a receiver that supplies the tire pressure values and any alarms thereof to a tire inflation pressure monitor having a display. The tire inflation pressure monitor and display may be part of a driver information display located in the dashboard, a console or the sun visor area of the vehicle.

The tire pressure sensor-transmitter is a low power, radio frequency device having a self-contained battery with sufficient life for the system to be of practical use. The device is small enough to fit inside a tire or to be incorporated in a valve stem. The tire pressure sensor-transmitter periodically sends pressure information to the receiver of the tire inflation pressure monitor and display. Each of the tires on the vehicle, including the spare tire(s), has a tire pressure sensor-transmitter with a unique code or other identifier. This identifier is used to associate an inflation pressure reading with a particular tire in a known location. Therefore, the tire inflation pressure monitor and display inside of the vehicle when calibrated or programmed indicates to the driver the location of the tire having an inflation pressure problem.

A problem exists in such systems, however, when tires are rotated or replaced. In those cases, the locations of the uniquely coded tire inflation pressure sensor-transmitters change. Manual recalibration or reprogramming of the tire inflation pressure monitor and display is necessary if correct tire location indication is desired with the pressure indication and/or alarm functions. Thus, there remains a need for a reliable, simple and automatic way of determining the actual location on a vehicle of a tire inflation pressure sensor-transmitter, and for systems providing such determined locations with pressure indication and/or alarm functions.

SUMMARY OF THE INVENTION

The invention overcomes the above-identified problems, as well as other shortcomings and deficiencies of existing technologies, by providing in one aspect a method and apparatus for monitoring the inflation pressure of each tire on a vehicle and determining the associated wheel location thereof. Advantageously, embodiments of the invention do not require a physical or hardwired electrical connection to each tire from a receiver for the determination of inflation pressure and wheel location thereof. In one embodiment, a wireless tire inflation pressure measuring device is attached to or is a part of each vehicle tire and is adapted for measuring the inflation pressure. A tire inflation pressure monitor receives the inflation pressure information from each of the wireless tire pressure measuring devices by radio frequency transmission or electromagnetic coupling. The tire inflation pressure monitor may indicate each tire inflation pressure being monitored and also may be adapted to produce an alarm indication, e.g., when a tire inflation pressure is below a certain pressure value, outside an acceptable range, falling, etc. The location of the tire having the inflation pressure alarm also may be indicated. A tire inflation pressure monitor adapted to provide such indication may be located, by way of example, in the visor area of the vehicle, attached to a sun visor or built into a console of the vehicle. Alternatively, the tire inflation pressure monitor may be attached to or built into the dashboard of the vehicle, or the pressure can be announced by voice, projected onto a surface such as a windshield, displayed by video monitor, etc.

In an embodiment of the present invention, a wireless tire inflation pressure measuring device may be built into the air valve stem or adapted to attach to a tire's existing air valve stem. It is contemplated and not outside the scope of the invention that the wireless tire pressure measuring device may also be built into or be disposed proximate to the tire, wheel (for convenience, wheel and wheel rim are used interchangeably herein), and/or valve stem. The wireless tire inflation pressure measuring device may comprise a pressure sensor having a pressure signal output, an electronic circuit for converting a pressure signal (e.g., from the pressure sensor) to an electronic pressure information signal, a low power radio frequency transmitter adapted to transmit the electronic information signal on a radio frequency signal, an antenna coupled to the low power radio frequency transmitter and adapted to radiate the radio frequency signal, and a battery operably coupled to power the low power radio frequency transmitter and electronic circuit.

The pressure sensor may be any type of pressure sensor which converts a pressure input to an electronic pressure signal output. The electronic circuit may comprise an analog or digital encoder/modulator that is adapted to modulate the low power radio frequency transmitter with information representing, reflecting, or corresponding to the electronic pressure information signal and, in some of the embodiments, an identifier. The identifier may be used to associate a tire with inflation pressure information. In one embodiment, the identifier may be a tone or other subcarrier being modulated by the electronic pressure information signal (e.g., in the case of analog modulation). In another embodiment, (e.g., for digital modulation) the identifier advantageously is a digital code which is part of a digital modulation code word containing both the identifier and a digital representation of the electronic pressure information signal.

Low power radio frequency transmitters, one for each tire, may be adapted to transmit via an antenna a radio frequency carrier signal containing the identifier and electronic pressure information signal to a radio frequency receiver that may be part of a tire inflation pressure monitor located inside of the vehicle. The antenna advantageously is oriented at the tire such that the signal strength of the transmitted radio frequency signal at the radio frequency receiver varies as the tire rotates. Thus, the rotation of the tire (resulting in changing antenna orientation) amplitude modulates the carrier of the transmitted radio frequency signal at the rotational rate of the tire. One rotation of the tire will produce one amplitude variation cycle of the radio frequency carrier. This amplitude variation (modulation) may be detected so as to determine the rotational speed of each tire.

When a vehicle makes a turn, the tires on the outer radius of the turn rotate faster than the tires on the inner radius of the turn. Further, the rear tires take short cuts relative to the front tires, thereby traveling in the same time a shorter distance than do the front tires. Thus, the rear tire rotates at a slower speed relative to the front tire on each side of the vehicle.

Since the rotational speed of each tire may be determined as disclosed herein, and the direction of the turn also may be known, it may be determined which of the front and rear tires are on the left side and on the right side of the vehicle.

Further, when a vehicle makes a turn each tire follows a different radius arc. If one imagines four concentric circles, one for each tire, and the vehicle making a right turn, then the right rear tire will be on the inner most circle, the right front tire will be on the next to inner most circle, the left rear tire will be on the next circle out, and the left front tire will be on the outer most circle. In such a case there will be four distinct rotational speeds or periods, one for each tire. The relationship between the four periods may be expressed mathematically as follows:

For a right turn: $P_{rr} > P_{rf} > P_{lr} > P_{lf}$

For a left turn: $P_{lr} > P_{lf} > P_{rr} > P_{rf}$

Where $P_{rr}$ is the time period of the right rear tire, $P_{rf}$ is the time period of the right front tire, $P_{lr}$ is the time period of the left rear tire, $P_{lf}$ is the time period of the left front tire. Accordingly, by knowing the direction the vehicle is turning and the above tire rotation speed relationships, the location of each tire of the vehicle may be determined.

Vehicle turn direction may be known or determined from or by using a motion sensor-detector. Examples of motion sensor-detectors include, by way of example and without limitation, a compass; a gyroscopic device; one or more signals from, e.g., turn indicators, steering wheel limit switches, transmission position indicators (vehicle direction forward or reverse); a left/right acceleration sensor; etc. The vehicle spare tire does not rotate and thus may be easily distinguished from the tires in contact with the road.

In another embodiment, the direction that the front tires are turned is determined and used along with the tire rotation speeds to ascertain tire positions on the vehicle. For example, rotational limit switches incorporated into the steering wheel column, or existing turn signals, may be used to determine the direction of steering wheel turn, and thus the turn position of the front tires. The turn position of the vehicle front wheels relative to an axis along the length of the vehicle, as viewed from the passenger compartment facing the front of the vehicle, may be used to determine the wheel locations. When the turn position of the vehicle front wheels is to the right of the axis, the fastest rotation speed is associated with the left front tire, the second fastest rotation speed is associated with the left rear tire, the third fastest rotation speed is associated with the right front tire and the slowest rotation speed is associated with the right rear tire. Conversely, when the turn position of the vehicle front tires is to the left of the axis, the right front tire has the fastest rotation speed, the right rear tire has the second fastest rotation speed, the left front tire has the third fastest rotation speed and the left rear tire has the slowest rotation speed.

In another embodiment, the difference in the rotational speeds of the inner (slower rotational speed) and outer (faster rotational speed) radii wheels and information about the direction of the turn (left or right) may be used in determining the relative position of each tire on the vehicle (e.g., left front, right front, left rear and right rear). The radio frequency receiver may distinguish relative signal level amplitudes between the front and rear tire low power radio frequency transmitters for each tire pair of a side (left and right). Generally, for each such tire pair the front tire transmitter is closer to the radio frequency receiver in the tire pressure monitor and display console than is the rear tire transmitter. Thus, the relative radio frequency carrier amplitude of the front tire transmitter will be stronger than that of the relative radio frequency carrier amplitude of the rear tire transmitter. The embodiment of the invention thereby automatically may determine each tire location as the vehicle makes a turn. Again, vehicle turn direction may be determined from steering wheel position limit switches, a motion sensor-detector, etc., as disclosed herein, and the spare tire does not rotate and thus may be easily distinguished from the tires in contact with the road.

In operation, an embodiment may go into a "learn" mode in several ways, e.g., whenever a vehicle turn is detected, only when the vehicle is started, manually, after some predefined time interval, etc., or from a combination of one or more thereof. During the learn mode, tire location may be determined as described herein. After tire location has been determined, a tire inflation pressure monitor display, advantageously positioned for an exchange of information with the vehicle operator, may indicate the pressure and actual location of each tire on the vehicle. The pressure information transmitted from each tire has an identifier which is now associated with each known tire location. Thus, tire pressure and location monitoring and status indication may be operative throughout all driving and stopping conditions of the vehicle. Tire pressure information updates to the pressure monitor display may be at predefined time intervals or may be continuously performed.

Alarm limits may be programmed into the tire inflation pressure monitor, e.g., so that low pressure may be alarmed, high pressure may be alarmed, and normal operating pressures may be indicated. This information may be particularly advantageous with the use of "no-flat" tires that generally may operate without inflation pressure for only a certain number of miles of "no-pressure" use. In a further embodiment, the mileage of the vehicle may be tracked when there is a "no-pressure" condition for any one of the "no-flat" tires. A driver may be alerted to low inflation pressure tire condition, e.g., such as those conditions which may cause a loss of tire tread and which may result in accidents leading to subsequent injury to occupants of the vehicle.

In another embodiment, a radio frequency identification (RFID) tag is used instead of the low power radio frequency transmitter at each tire. The RFID tag advantageously requires no self-contained battery for operation. Instead, the RFID tag obtains operating power from a radio frequency (RF) or an electromagnetically coupled reader/interrogator. A RFID tag interrogator/reader antenna coil may be placed in each wheel well of the vehicle or otherwise proximate the tire. The wireless tire inflation pressure measuring device for each of the tires comprises a pressure sensor adapted for measuring tire inflation pressure and having a pressure information signal output, an RFID tag device adapted for receiving the pressure information signal from the pressure sensor and for using this pressure information signal to modify the amplitude of the RFID tag reader carrier signal, and a RFID tag antenna coil for electromagnetically coupling to the RFID tag reader antenna coil. Such an embodiment may prove to be particularly advantageous in the case of tractor-trailer truck vehicles, which typically have up to 18 tires in contact with the pavement. As described herein, the pressure measuring device may be built into the air valve stem, may be adapted to attach to the tire's existing air valve stem, or may be built into or be disposed at or proximate to the tire, wheel rim and/or valve stem.

The RFID tag interrogator/reader antenna coils, proximate the tires (e.g., one in each of the wheel wells of the vehicle), may be connected to a multiple port RFID tag interrogator/reader or one RFID tag interrogator/reader for each antenna coil. The RFID tag interrogator/reader(s) may be connected to the tire inflation pressure and location monitor and display so that each tire inflation pressure may be displayed and alarm limits set. The location of each of the wireless tire inflation pressure measuring devices may be determined easily by which interrogator/reader antenna coil is obtaining the tire inflation pressure information from the associated RFID tag. No learning mode is needed and, depending upon the range of the RFID tag and reader, a tire may not need to rotate past the associated interrogator/reader antenna coil to be within the range of the reader, e.g., pressure may be monitored even when the vehicle is stationary.

A radio frequency identification (RFID) tag generally comprises a device that stores identification information that it transfers to a radio frequency tag reader (interrogator) which transmits RF signals and receives data signals from the RFID tag. An RFID tag also may include the transfer of other information, e.g., pressure, temperature, etc. when the device is powered-up by a radio frequency (RF) or electromagnetic signal from the interrogator. RFID tags typically use radio frequencies that have increased penetration characteristics to material, as compared to optical signals, which may prove to be more advantageous in hostile environmental conditions than bar code labels (optically read). Thus, RFID tags typically may be read through paint, water, dirt, dust, human bodies, concrete, or through the tagged item itself.

A passive RFID tag has no internal power source, instead using an incoming RF or electromagnetic signal as a power source. Once activated, the RFID tag conveys stored identification and pressure sensor information to an interrogator/reader by modifying the amplitude of the RF carrier signal from the reader. The amplitude of the RF Carrier is affected by detuning a resonant circuit of the RFID tag that is initially tuned to the RF carrier signal. De-Qing (e.g., resistive loading) of the resonant circuit in the RFID tag also may also be used to modify the amplitude of the RF carrier signal of the reader-interrogator. The resonant circuit of the RFID tag may be, for example, a parallel connected inductor and capacitor that is used as an antenna and that is resonant (tuned) to the frequency of the RF carrier signal of the interrogator. A semiconductor integrated circuit may be connected to the parallel resonant antenna circuit, and may comprise an RF to direct current (DC) converter; a modulation circuit to send the stored and/or sensor information to the reader-interrogator; a logic circuit which stores coded information; a memory array that stores digitized information; and controller logic that controls the overall functionality of the RFID tag.

In another embodiment, a wireless tire inflation pressure measuring device may be built into an air valve stem; may be adapted to attach to an air valve stem; or may be built into or disposed at or proximate to the tire, wheel (wheel rim), and/or valve stem. The wireless tire pressure measuring device may comprise a pressure sensor, an electronic circuit for converting a pressure information signal (e.g., from a pressure sensor) to an electronic information signal, a low power radio frequency transmitter adapted to transmit the electronic information signal on a radio frequency signal, an antenna connected to the low power radio frequency transmitter and adapted to radiate the radio frequency signal, and a battery to power the low power radio frequency transmitter and electronic circuit.

A receiver having transmitted signal direction location capabilities may be used to pinpoint the source locations of the radio frequency transmissions from each tire having a low power radio frequency transmitter. Once the location of each transmitter is determined, the tire inflation pressure monitor display may indicate tire inflation pressures and locations thereof. Such an embodiment may prove to be particularly advantageous in the case of tractor-trailer truck vehicles, which may have 18 tires in contact with the pavement.

In another embodiment, wireless tire inflation pressure measuring devices may be read by interrogator/readers located in a toll booth and/or an inspection station for vehicles such as trucks, cars, airplanes, etc., so that a driver, a law enforcement official, an inspector or another individual may be alerted when an undesirable tire inflation pressure condition exists. For example, low inflation pressure in a truck tire may cause the tire tread to separate from the tire body. Such separated tire tread (sometimes called a "gator" because of the way it looks on the road) may litter the highway and potentially cause harm to unsuspecting motorists.

Either low power radio frequency transmitters or RFID tags may be used in combination with a reader in a toll booth or inspection station. In addition, an electronic serial number or other identifier may be embedded in the wireless tire pressure measuring device electronics so that a toll booth or inspection station may catalogue or determine the owner of the vehicle having a low and/or high pressure tire which may cause a hazardous condition to occur. In another embodiment, the toll booth or inspection station also may be adapted to photograph a vehicle, driver, and/or license plate upon detection of an undesirable condition (e.g., a low tire pressure) to enable later determination of responsibility or liability, notification for repair, issuance of warnings or citations, etc.

A structure (fixed or moveable) having a RFID interrogator/reader antenna adapted for reading the RFID tags on a vehicle passing therethrough (fleet vehicle control for inventory) also may be utilized for determining the presence of a low inflation pressure condition in a tire(s) of the vehicle. For example, two interrogator/readers may be located one on each side of a roadway (e.g., a lane through the toll booth or inspection station). Each of the two interrogator/readers may be adapted to read tire inflation pressure signals from each tire on its respective side of the vehicle. The axle location of each tire may be determined in sequential order when the vehicle travels along the lane between the two interrogator/readers. A detector may be used to determine the beginning presence of a vehicle tire(s) or vehicle body (front end) and the ending presence (back end). The detector may be, by way of example and without limitation, a light beam, a weight detection sensor, a pressure sensitive cord disposed across the lane (pneumatically or electrically actuated), etc. The vehicle presence detector, in combination with the two interrogator/readers, thus may be used to determine the location of a tire with low inflation pressure. A warning sign may alert the driver before the vehicle leaves or travels too far along the lane. In one embodiment, wheel axle and vehicle side information may be provided to help quickly identify an undesirable tire inflation condition. Such warning information may be transmitted to the vehicle for broadcast or display therein, or the warning information may be displayed on a sign along the lane for viewing from the vehicle.

In another embodiment, each tire may have a wireless pressure measuring device attached thereto. A tire inflation pressure monitor and display may have an integral receiver/interrogator/reader that is operable to read tire inflation pressure information and an identifier for each tire. For instance, the tire inflation pressure monitor and display may be a portable hand-held device adapted to clip onto a sun visor of the vehicle to enable easy removal from the visor and vehicle. Calibration for the location of each tire may be accomplished by placing the tire inflation pressure monitor and display into a location learning mode and manually programming the appropriate tire location based on each individual identifier of the wireless pressure measuring devices of each tire. This location learning mode for associating tire inflation pressure information signals with tires may involve visually determining the location of each wireless tire inflation pressure measuring device. It also may involve sensing a stimulating event for each tire (e.g., sensing the kicking of a tire with a shoe), or using relative proximity and signal strength in determining the appropriate tire location. A portable or hand-held tire inflation pressure monitor and display may be brought in close proximity to a tire, so that the resulting relatively stronger radio frequency signal strength from that tire may be used to learn the tire's identifier, e.g., upon entry into the tire pressure monitor of the appropriate tire location on the vehicle. The field of the portable reader may also actuate the transmitter to provide tire location and unique code or identifier information. Either low power radio frequency transmitters or RFID tags may be utilized in the wireless inflation pressure measuring device.

In another embodiment, a remote indicating electronic tire inflation pressure monitor may be used to alarm on an undesired tire inflation pressure condition and/or to give relative tire pressures. The tire inflation pressure monitor may display each of the tire inflation pressures with associated code symbols such as letters and/or numbers. When an undesirable tire inflation pressure "event" occurs, the inflation pressure monitor may alert the driver, who may then stop the vehicle and locate a problem tire by finding the indicated code symbol. In one aspect, wireless tire pressure measuring devices adapted for easy and quick attachment to existing tire valve stems may be used.

Accordingly, the embodiment may provide an aftermarket addition to any type of vehicle tire, thus allowing a quick and inexpensive solution to the problems associated with monitoring tire inflation pressures on vehicles not heretofore having this capability (e.g., easily locating problem tires to effect repairs). Either low power radio frequency transmitters or RFID tags may be utilized in the wireless inflation pressure measuring device.

The embodiments described herein also may measure tire temperature. At high speeds and extended travel times, tire temperatures generally tend to increase, resulting in increased tire inflation pressures. If only pressure is measured, an actual low pressure condition for normal conditions may not be recognized because a tire is at a high temperature (with a subsequent increase in tire inflation pressure). Thus, by correlating tire temperature with inflation pressure a more accurate assessment may be made of proper and desired tire inflation pressure. For example, in accordance with one exemplary embodiment of the invention, the temperature information may be sent with the pressure information signal, identifier, etc., to the tire inflation pressure monitor and display for processing. Alternately, the pressure information can be compensated at the tire using the temperature information from the temperature sensor, so that a temperature compensated tire pressure is transmitted along with the identifier, etc.

In any of the embodiments of the invention, the remote indicating electronic tire inflation pressure logic may be adapted to generate an alert signal when a tire pressure is at a desired pressure value, and/or when the tire pressure has exceeded a maximum value. For example, when adding air to a tire of a stopped vehicle, the alert signal, e.g., audible-horn chirp(s), tone(s) from a speaker, or visual-lights flashing, may be used to alert the person adding air to the tire that the tire pressure has reached a desired value. Another alert signal could also be used to alert when the inflation pressure has exceeded a maximum value. This embodiment would eliminate the need to measure tire pressure with a tire pressure gauge, either during or after filing the tire with air. Also, safer, faster and more accurate tire inflation would be achieved because there is no requirement for having to read a tire pressure gauge in the rain, fog, or poor light conditions.

The embodiments of the invention described herein also may include encrypting signals such as the tire inflation pressure signal, so that false inflation pressure information cannot be substituted by a criminal or prankster for the actual tire inflation pressure. Thus, a potential car-jacker no longer would have the ability to follow a vehicle, record the tire inflation pressure signals and substitute false inflation pressure signals that could overcome the actual inflation pressure transmitter signals. Unfortunately, such tactics have been used to cause a false inflation pressure alarm, with the intention of causing an unsuspecting motorist to stop to examine or change the apparently faulty tire, thus presenting the car-jacker with an opportunity for illegal activities.

A secure encryption scheme using, for example but not limited to, a rolling code may be effectively incorporated to prevent false pressure signal infiltration. Security and encryption systems describing technologies useful for this purpose are more fully described in commonly owned U.S. Pat. No. 5,686,904, entitled "Secure Self Learning System" by Frederick Bruwer; U.S. Pat. No. 5,675,622, entitled "Method and Apparatus for Electronic Encoding and Decoding" by Bruwer, et al.; U.S. Pat. No. 5,517,187, entitled "Microchips and Remote Control Devices Comprising Same" by Bruwer, et al.; patent application Ser. No. 07/985,929, entitled "Encoder and Decoder Microchips and Remote Control Devices for Secure Unidirectional Communications" by Bruwer, et al.; Ser. No. 09/074,730, entitled "System for Encoded RF and Encoded Magnetic Field Communication and Method Therefor" by Bruwer, et al.; and Ser. No. 09/672,484, entitled "Encoder and Decoder Microchips and Remote Control Devices for Secure Unidirectional Communication" by Bruwer, et al., all hereby incorporated by reference herein for all purposes.

Features of such security systems and their related technology may be used as features of alternate embodiments of the present invention. Thus, the subject matter of the present application for which protection is or may be sought may comprise aspects disclosed in the incorporated documents. Such features contribute to solve, by way of example and without limitation, the problem of false pressure signal infiltration as mentioned above. The features implicitly belong to the description of the present invention and are precisely defined and identifiable within the disclosure of the documents incorporated by reference herein. By way of further example and without limitation, an identifier and pressure information value could be encrypted so that secure measurements or other information may be presented to the vehicle operator. Similarly, a temperature measurement value also may be encrypted for e.g., secure display, use in calculations for display, alarming to the vehicle operator, etc.

Features and/or advantages associated with the present invention may include, without limitation, one or more of the following, either alone or in combination with one or more other features and/or advantages:

A feature of the invention is determining the location of a tire on a vehicle.

Another feature is determining tire inflation pressure and alarming a vehicle operator when tire inflation pressure is below a desired value.

Another feature is determining tire inflation pressure and alarming a vehicle operator when tire inflation pressure is above a desired value.

Another feature is determining the tire inflation pressure of a tire and the location thereof.

Another feature is automatically learning the location of a tire on a vehicle as the vehicle turns.

Another feature is learning the location of a tire on a vehicle during or after one or more vehicle turns.

Another feature is determining a turn direction of a vehicle for use in learning the location of a tire on a vehicle.

Another feature is reading inflation pressure and identification information for a tire on a vehicle.

Another feature is determining inflation pressure, identification and location of a tire on a vehicle.

Another feature is displaying inflation pressure for a tire on a vehicle.

Another feature is displaying inflation pressure on a sun visor console for a tire on a vehicle.

Another feature is displaying inflation pressure in a dashboard display for a tire on a vehicle.

Another feature is determining tire rotation speed.

Another feature is determining tire locking during skidding, e.g., in icy road conditions.

Another feature is differentiating between the rotational speeds of two or more tires on a vehicle during or after a turn.

Another feature is transmitting inflation pressure value and identification information for a tire on a vehicle.

Another feature is measuring inflation pressure for a tire on a vehicle with a wireless measurement system.

Another feature is determining the location of a tires having a wireless transmitter and directional location means.

Another feature is reading tire inflation pressure with a radio frequency identification system.

Another feature is reading inflation pressures of a vehicle tire as the vehicle passes through a toll booth or inspection station.

Another feature is alerting when a tire pressure is at a desired value. to Another feature is alerting when a tire pressure has exceeded a maximum value.

Another feature is audibly alerting when a tire pressure is at a desired value.

Another feature is alerting while filling a tire when the tire pressure reaches a desired pressure value.

Another feature is alerting while filling a tire when the tire pressure exceeds a maximum pressure value.

An advantage of the invention is wireless monitoring of tire inflation pressure.

Another advantage is automatically determining tire location on a vehicle during or after one or more turns.

Another advantage is alarming in the event of undesirable tire inflation pressure condition(s).

Another advantage is detecting an undesirable tire inflation pressure condition as a vehicle passes along an inspection or monitoring lane.

Further features and/or advantages include performing the acts described herein for a plurality of tires on a vehicle.

Further features and/or advantages include performing the acts described herein for each of the tires on a vehicle.

BRIEF DESCRIPTION OF THE DRAWINGS

Further objects and advantages of the present invention will be apparent upon reading the following detailed description and upon referring to the accompanying drawings in which:

FIG. 1 illustrates a schematic elevational view of an exemplary embodiment of a wireless tire inflation pressure measuring device associated with a tire in accordance with the present invention.

Figure 2A:
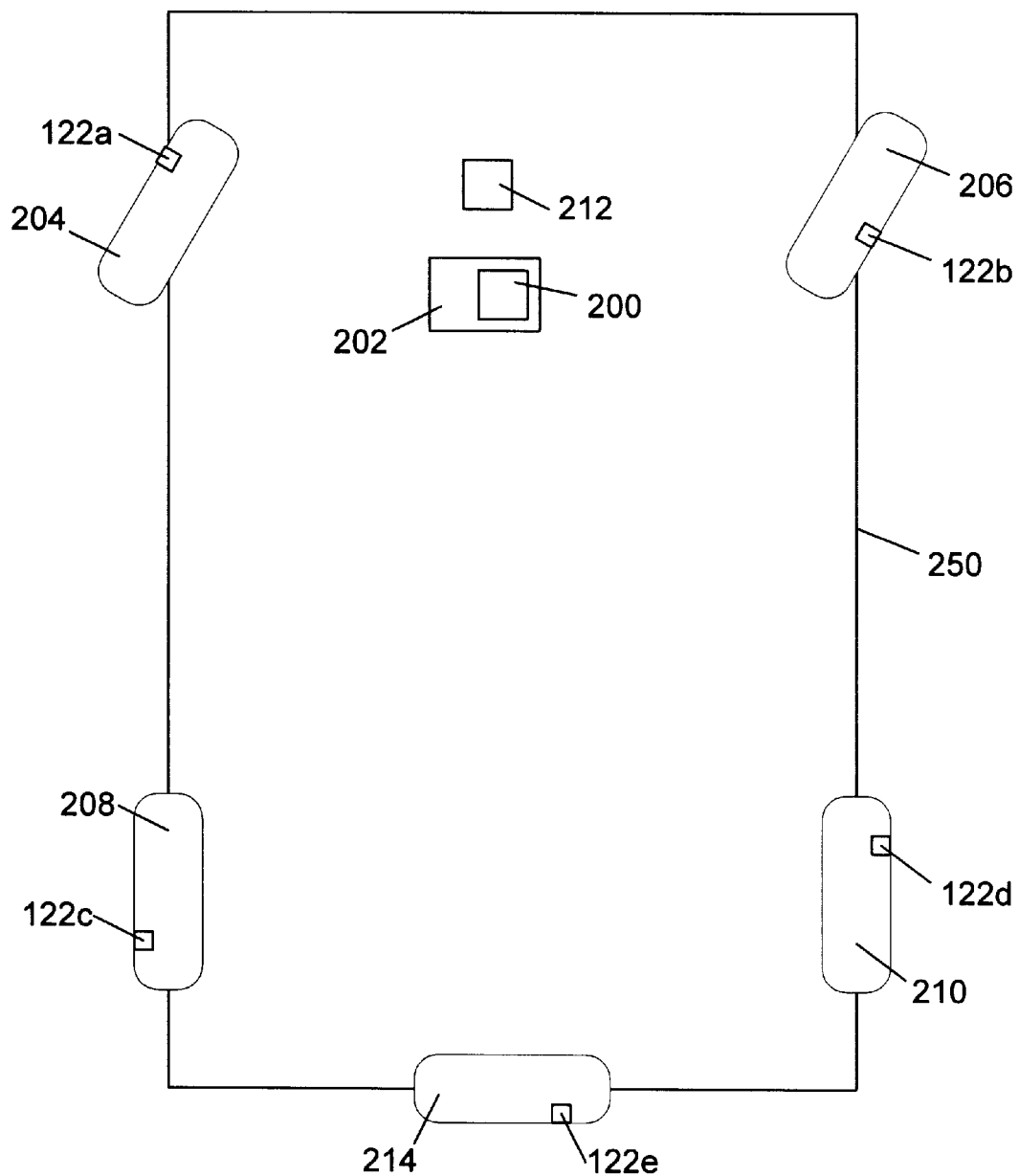
FIGS. 2a and 2b illustrate schematic plan views of a vehicle comprising an exemplary embodiment in accordance with the present invention.

While the present invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

For the sake of clarity and convenience, the various exemplary embodiments are described herein in the context of applications involving measurement and display of vehicle tire pressure. However, the present invention also may be useful in other applications such as tire temperature, skid control, anti-lock brakes, etc.

Referring to the drawings, the details of exemplary embodiments of the invention are schematically illustrated. Like elements in the drawings will be represented by like numbers, and similar elements will be represented by like numbers with a different lower case letter suffix.

The present invention generally is directed to vehicle tire inflation pressure monitoring by building into an air valve stem, or attaching to a valve stem or wheel (wheel rim) a wireless tire inflation pressure measuring device, and then utilizing the signals from the wireless devices in determining the location of each tire being monitored. An identifier may be associated with the inflation pressure information of each tire on the vehicle. Tire rotation speed may be determined by amplitude fluctuations of a radio frequency carrier from a radio frequency transmitter rotating with the tire. Differences in tire rotation speeds during a turn may be used in determining the location of each tire on the vehicle. An antenna may be placed on each wheel rim or valve stem toward (preferably near the outer perimeter of the wheel rim) and connected to a radio frequency transmitter. A radio frequency identification (RFID) tag and pressure sensor also may be used as the wireless tire inflation pressure measurement device and wheel locator. For example, a RFID pickup coil may be provided in each wheel well for determining wheel location and tire inflation pressure information from each RFID tag mounted on a wheel (wheel rim) or valve stem.

Referring to FIG. 1, a schematic elevational view of an exemplary embodiment of a wireless tire inflation pressure measuring device associated with a tire in accordance with the present invention is illustrated. The wireless tire inflation pressure measuring device, generally represented by the numeral 110, may be adapted to attach to an existing air valve stem 112 of a wheel rim 113 (tire 114 is mounted to the wheel rim 113) (wheel and wheel rim are used interchangeably herein). It is contemplated and within the scope of the invention that the wireless tire pressure measuring device 110 may also be built into, disposed at or proximate to the tire 114, air valve stem 112, or wheel rim 113. The wireless tire inflation pressure measuring device 110 may comprise a pressure sensor 116, an electronic circuit (not shown) for converting the pressure signal from the pressure sensor 116 to an electronic information signal, a low power radio frequency transmitter 122 that is adapted to transmit (continuously or intermittently) the electronic information signal on a radio frequency signal, an antenna 124 connected to the low power radio frequency transmitter 122 which is adapted to radiate the radio frequency signal, and a battery 120 to power the low power radio frequency transmitter 122 and electronic circuit.

The pressure sensor 116 may be any type of pressure sensor which converts a pressure input to an electronic pressure signal output. The electronic circuit comprises an analog or digital encoder/modulator that is adapted to modulate the signal of the low power radio frequency transmitter 122 with information containing the electronic pressure signal. The transmitted signal also may include some type of identifier that may be used to associate a tire with inflation pressure information. In one embodiment, the identifier may be a tone or other subcarrier being modulated by the electronic pressure information signal (e.g., in the case of analog modulation). In another embodiment, (e.g., for digital modulation) the identifier advantageously is a digital code which is part of a digital modulation code word containing both the identifier and a digital representation of the electronic pressure information signal.

Figure 2B:
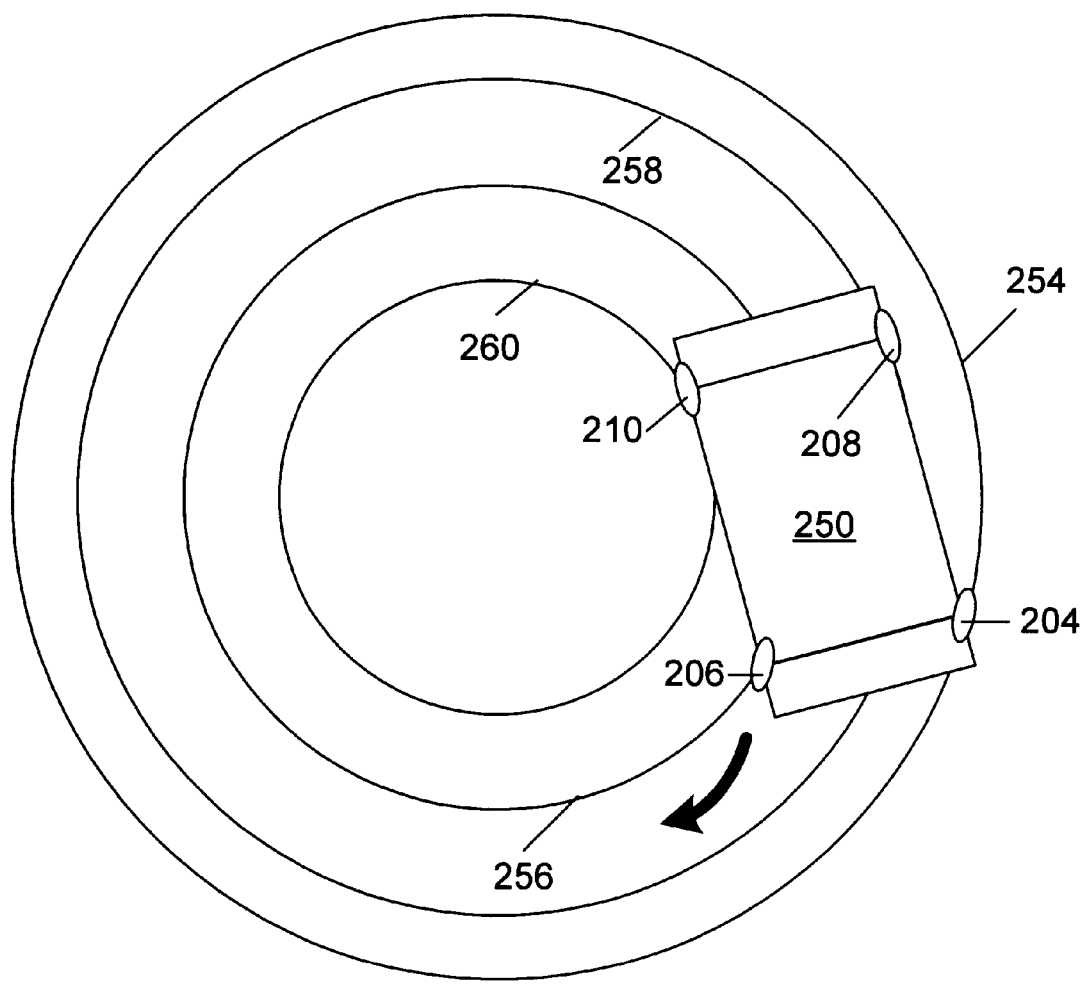

Referring to FIGS. 2a and 2b, schematic plan views of a vehicle comprising an exemplary embodiment in accordance with the present invention are illustrated. A vehicle 250 has tires 204, 206, 208 and 210 mounted to the vehicle 250 and in contact with the ground, and a spare tire 214 (not shown in FIG. 2b, see FIG. 2a). Low power radio frequency transmitters 122a, 122b, 122c, 122d and 122e, one mounted on each wheel of the tires 204, 206, 208, 210 and 214, respectively, may be adapted to transmit via an antenna a radio frequency carrier signal containing the identifier and electronic pressure information signal to a radio frequency receiver 200 which may be part of a tire inflation pressure monitor display 202 located inside of the vehicle 250. The antenna 124 (see, e.g., FIG. 1) advantageously is positioned generally toward the outer radius of the tires 204, 206, 208, and 210 such that this orientation results in the signal strength of each of the transmitted radio frequency signals received at the radio frequency receiver 200 varying as each of the tires rotate. Thus, the rotation of a tire (resulting in changing antenna orientation) effectively amplitude modulates the carrier of the transmitted radio frequency signal at the rotational speed (frequency) of the tire. One rotation of the tire will produce one amplitude variation cycle of the radio frequency carrier. This radio frequency signal carrier amplitude variation (amplitude modulation) may be detected by an amplitude modulation detector (not illustrated) in the receiver 200 so as to determine the rotational speed of each tire.

Referring to FIG. 2b, when the vehicle 250 is making a turn, as shown, the tires 204 and 208 on the outer radii of the turn rotate faster than the tires 206 and 210 on the inner radii of the turn. Since the rotational speed of each tire has been determined as disclosed herein, and if the direction in which the vehicle 250 is turning is known, it may be determined which of the front and rear tires are on the left side and on the right side of the vehicle 250.

During a turn, the rear tires 208 and 210 take a short cut relative to the same side front tires 204 and 206, respectively, and thereby travel in the same time a shorter distance than do the same side front tires 204 and 206. Thus the rear tire rotates at a slower speed relative to the front tire on each side of the vehicle.

Therefore, when the vehicle makes a turn each tire follows a different radius arc. For example, in FIG. 2b, four concentric circles 254, 256, 258 and 260 represent the arcs made by the tires 204, 206, 208 and 210, respectively. The right rear tire 210 will be on the inner most circle 260. The right front tire 206 will be on the next to inner most circle 256. The left rear tire 208 will be on the next circle 258. The left front tire 204 will be on the outer most circle 254. Thus there will be four distinct rotational speeds or periods, one for each tire. This relationship may be expressed mathematically as follows:

For a right turn: $P_{rr} > P_{rf} > P_{lr} > P_{lf}$

For a left turn: $P_{lr} > P_{lf} > P_{rr} > P_{rf}$ where $P_{rr}$ is the time period of the right rear tire 210, $P_{rf}$ is the time period of the right front tire 206, $P_{lr}$ is the time period of the left rear tire 208, and $P_{lf}$ is the time period of the left front tire 204. Knowing the direction the vehicle is turning and the above tire rotation speed relationships (the frequencies of the signal carrier amplitude variations) the location of each tire may be determined.

Vehicle turn direction may be ascertained by using a motion sensor-detector 212. Examples of such detectors include, without limitation, a gyroscopic device, relative compass movement, a directional accelerometer, signals from a turn indicator or steering wheel limit switches (see FIG. 3), and transmission position indicators (vehicle direction forward or reverse) (not shown). The spare tire 214 does not rotate and thus may be easily distinguished from the tires in contact with the road.

Figure 3:
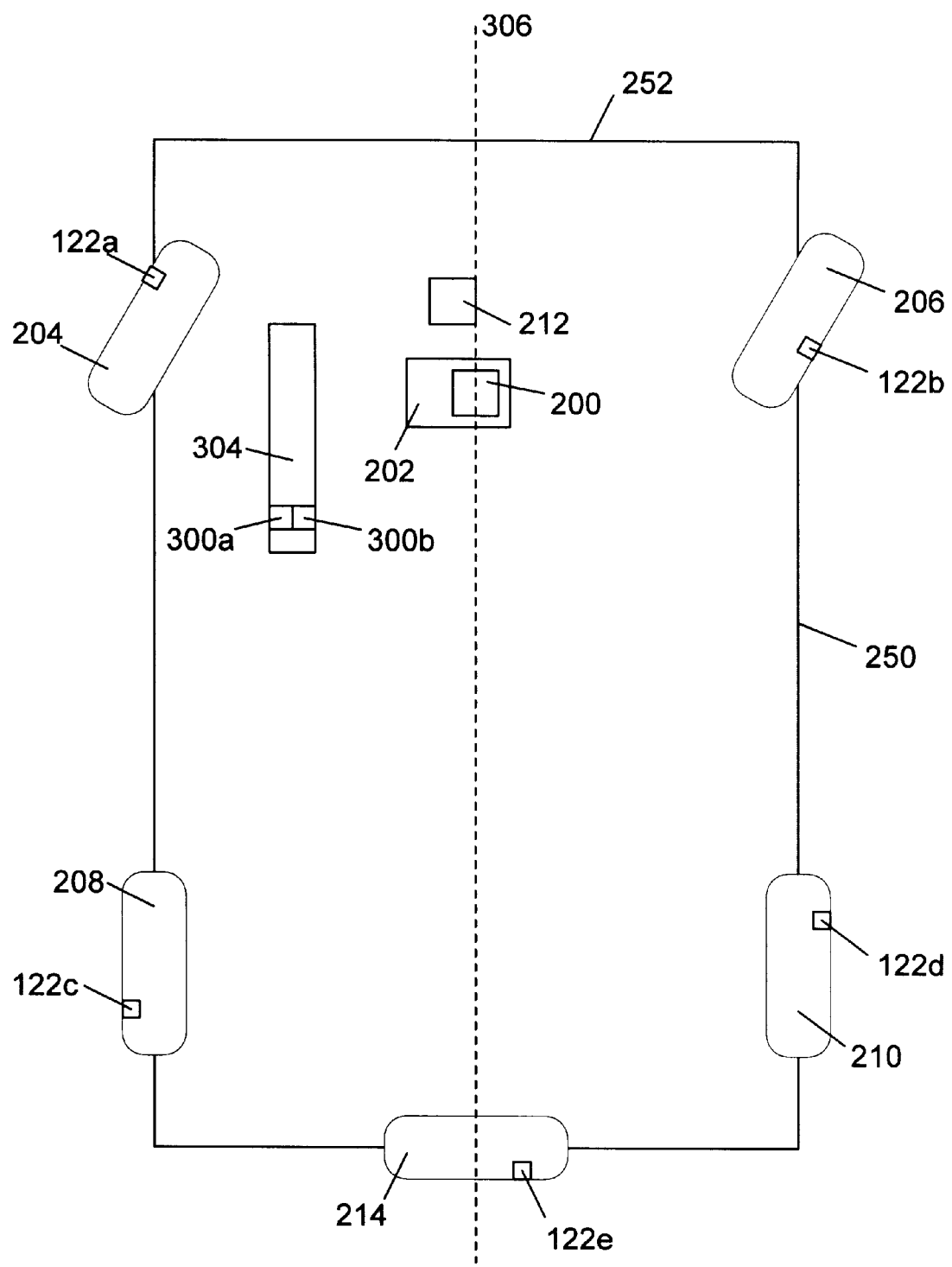
FIG. 3 illustrates a schematic plan view of a vehicle comprising another exemplary embodiment in accordance with the present invention.

Referring to FIG. 3, a schematic plan view of a vehicle comprising another exemplary embodiment in accordance with the present invention is illustrated. In this exemplary embodiment, only the direction that the front tires 204 and 206 are turned need be determined along with the tire rotation speeds for ascertaining the tire positions on the vehicle. Rotational limit switches 300a and 300b may be incorporated into the steering wheel column 304. Alternatively, existing turn signal assemblies (not shown) may be effectively utilized in determining the direction that the steering wheel is being turned and thus the turn position of the front tires 204 and 206.

For example, the turn position of the vehicle front tires 204 and 206 relative to a axis 306 along the length of the vehicle 250, as viewed facing the front 252 of the vehicle 250, may be used to determine the tire locations. When the turn position of the vehicle 250 front tires 204 and 206 is to the right of the axis 306, the fastest rotation speed is associated with the left front tire 204, the second fastest rotation speed is associated with the left rear tire 208, the third fastest rotation speed is associated with the right front tire 206, and the slowest rotation speed is associated with the right rear tire 210. Conversely, when the turn position of the vehicle front tires 204 and 206 is to the left of the axis 306, the right front tire 206 has the fastest rotation speed, the right rear tire 210 has the second fastest rotation speed, the left front tire 204 has the third fastest rotation speed and the left rear tire 208 has the slowest rotation speed.

Figure 4:
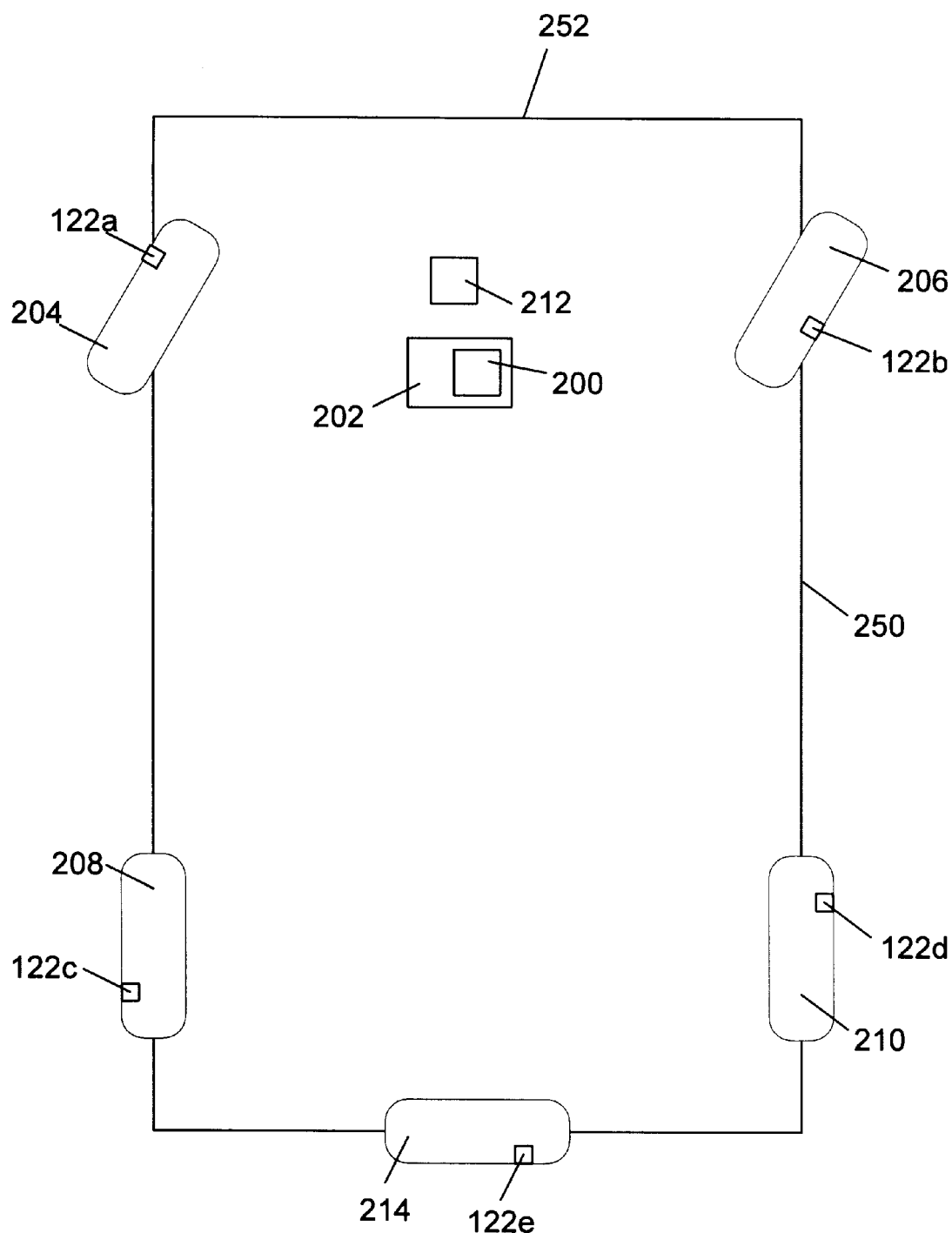
FIG. 4 illustrates a schematic plan view of a vehicle comprising another exemplary embodiment in accordance with the present invention.

Referring to FIG. 4, a schematic plan view of a vehicle comprising another exemplary embodiment in accordance with the present invention is illustrated. The difference in the rotational speeds of the inner (slower rotational speed) and outer (faster rotational speed) radii tires and information about the direction of the turn (left or right) may be used in determining on which side of the vehicle each tire of a set of tires (front and rear) is located. The radio frequency receiver 200 may also determine relative signal level amplitudes between the front and rear tire low power radio frequency transmitters 122 for each side tire pair (left and right). Generally, for each such tire pair the front tire transmitter is closer to the radio frequency receiver in the tire pressure monitor and display console than is the rear tire transmitter (the front tire transmitters 122a and 122b are closer to the radio frequency receiver 200 than is the rear tire transmitters 122c and 122d). Thus, the relative radio frequency carrier amplitudes of the front tire transmitters 122a and 122b will be stronger than that of the relative radio frequency carrier amplitudes of the rear tire transmitters 122c and 122d. This embodiment of the invention may thereby automatically determine each tire location as the vehicle makes a turn. Vehicle turn direction may be determined from, by way of example and without limitation, steering wheel position limit switches, a motion sensor-detector 212, etc., as disclosed herein. The spare tire 214 does not rotate and thus may be easily distinguished from the tires in contact with the road.

Another embodiment of the invention uses directional antennas in each pressure transmitter. As previously described, the rotation of each tire causes a periodic fading of the received radio signal with a repetitive fading pattern. The period of the pattern represents a single rotation period of the wheel. Since the front wheels on a standard vehicle are steerable while the rear wheels are on a fixed axle, the turning of the steering wheel causes some additional variation of the received signal strength from the front wheels. This steering-related fading (signal strength variation) is in addition to amplitude variations caused by wheel rotation. It is therefore possible to distinguish between front wheel and rear wheel transmissions by measuring the non-periodic variances in received signal strengths. The front wheels display larger variations in non-periodic signal strength due to steering-related fading. Alternatively, a signal filter can be used to filter out the periodic, wheel-rotation-related received signal fading. After filtering, only low-frequency, steering-related fading components of the received signal remains. The steering related fading can again be used to determine the steered (front) wheels.

In still another embodiment, tire pressure sensors may transmit only a few times every hour. Thus, it may be difficult to measure relative wheel speeds—since typically only one transmitter transmits at any time. In fact, it may be desirable for only one transmitter to transmit at any time to limit the system to a single channel receiver and single channel transmitter. To distinguish between left and right wheels, one embodiment uses statistical averaging methods. These methods assume that multiple samples of all four wheel speeds are taken over a sufficiently long period of time. Tire speeds may be averaged for individual tire speeds in one of two sets of "bins". The "bin" set selection is dependent upon the turning direction of the vehicle. In other words we use statistical methods of random sampling, averaging, and correlation to derive the location of each transmitter and thereby locate each respective tire having a pressure measurement thereof.

Figure 5:
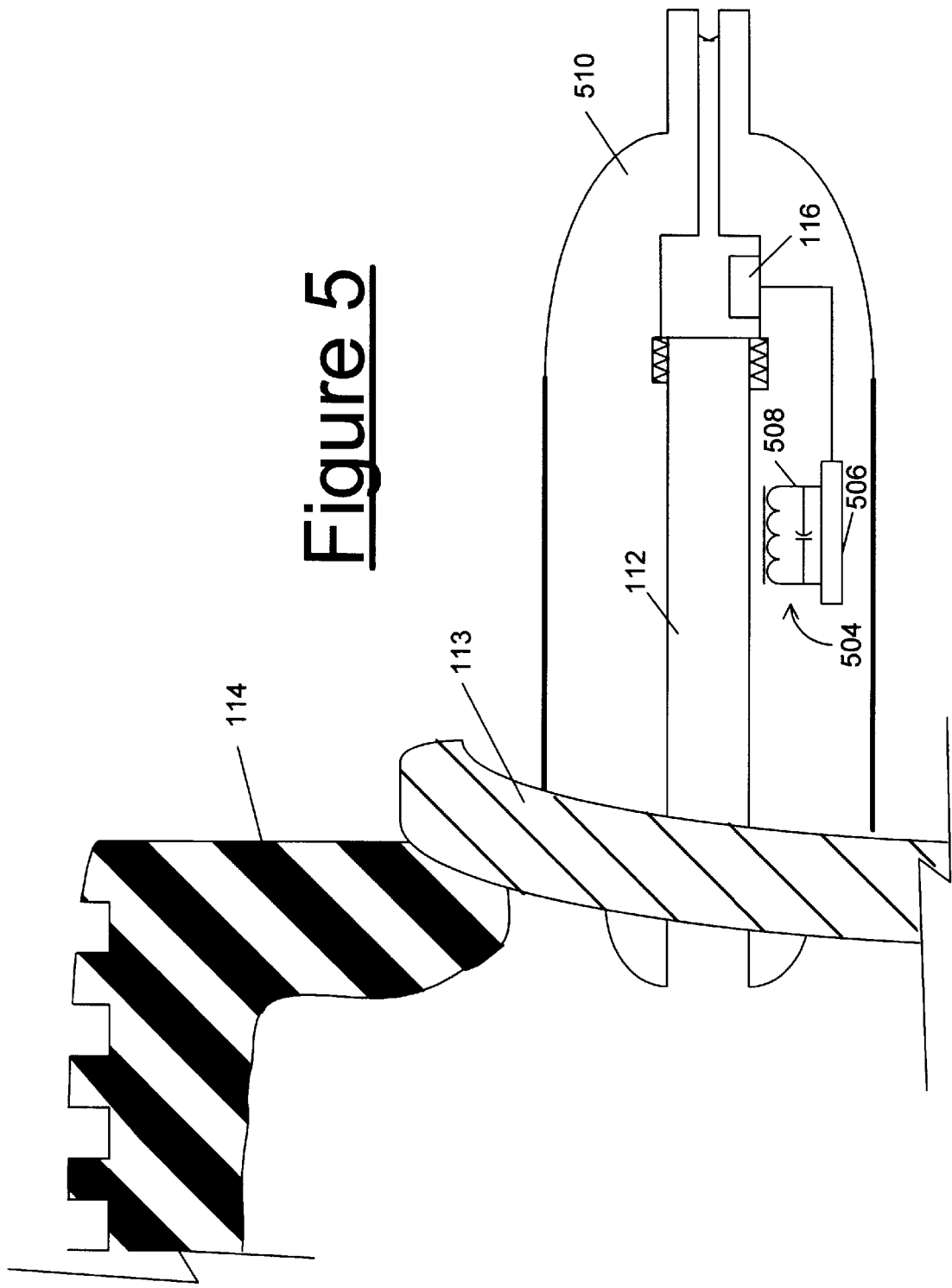
FIG. 5 illustrates a schematic elevational view of another exemplary embodiment of a wireless tire inflation pressure measuring device attached to a tire in accordance with the present invention.
Figure 6:
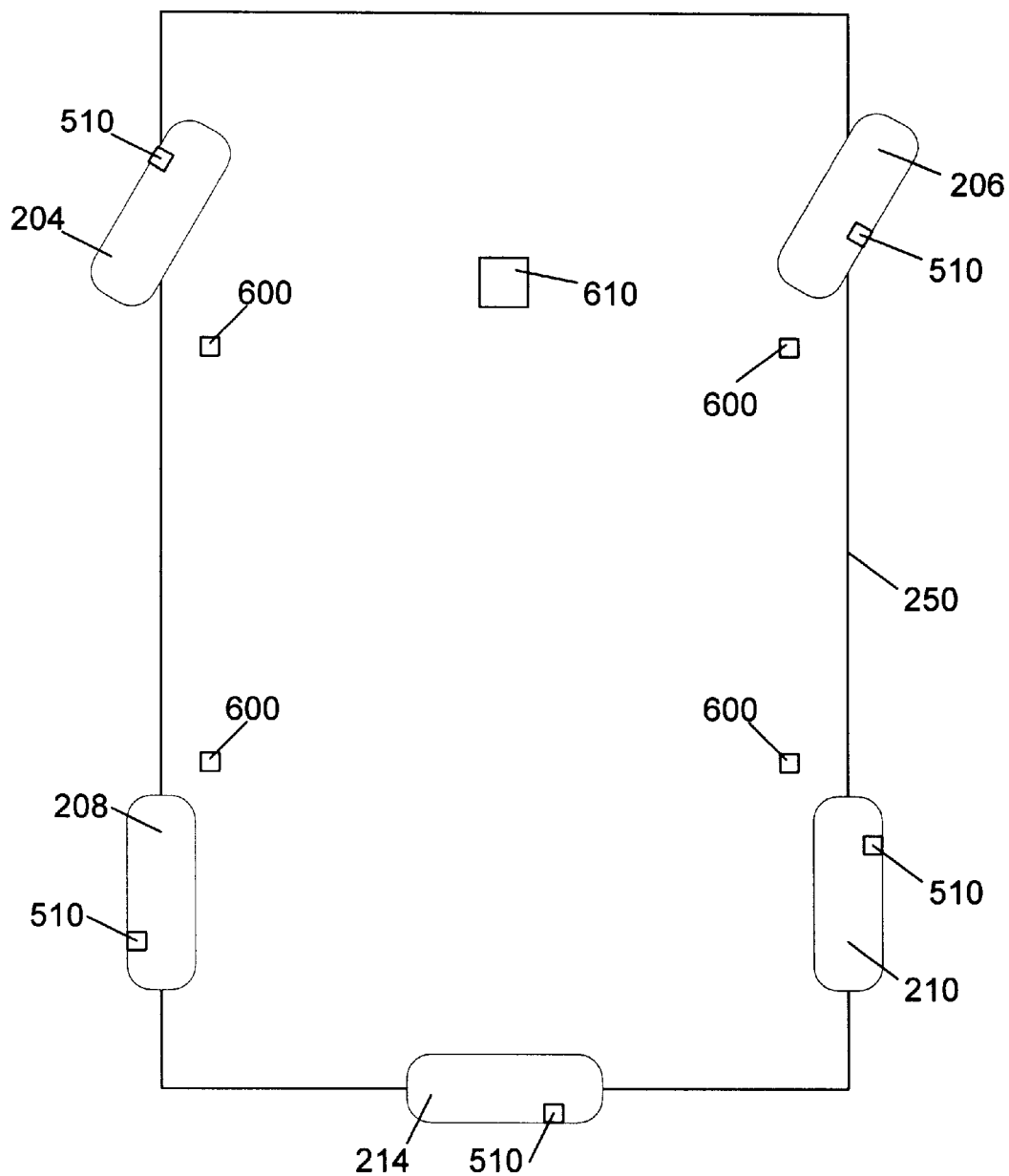
FIG. 6 illustrates a schematic plan view of a vehicle comprising another exemplary embodiment in accordance with the present invention.

Referring to FIG. 5, a schematic elevational view of another exemplary embodiment of a wireless tire inflation pressure measuring device attached to a tire in accordance with the present invention is illustrated. The wireless tire inflation pressure measuring device, generally represented by the numeral 510, may be adapted to attach to an existing air valve stem 112 of a wheel rim 113. It is contemplated and within the scope of the invention that the wireless tire pressure measuring device 510 may also be built into, disposed at or proximate to the tire 114, air valve stem 112, or wheel rim 113. The wireless tire inflation pressure measuring device 510 may comprise a pressure sensor 116 adapted for measuring tire inflation pressure and thereby generating a corresponding pressure signal. An RFID tag 504 comprises a RFID tag device 506 which is adapted for receiving the pressure signal from the pressure sensor 116 and a RFID tag antenna coil 508 for electromagnetically coupling to a RFID tag reader antenna coil 600 (FIG. 6). The RFID tag 504 transfers the pressure signal to the RFID tag reader 610, as described herein.

Referring to FIG. 6, a schematic plan view of a vehicle comprising another exemplary embodiment in accordance with the present invention is illustrated. The RFID tag 504 is used instead of the low power radio frequency transmitter 122 (FIG. 1) in the wireless tire pressure measuring device 510 located at each of the tires 204, 206, 208 and 210. An advantage of the RFID tag 504 is that it requires no self-contained battery for operation thereof. Instead of a self-contained battery, the RFID tag 504 obtains operating power from a radio frequency (RF) or an electromagnetically coupled reader/interrogator. In this embodiment of the invention, a RFID tag interrogator/reader antenna coil, generally represented by the numeral 600, is placed in close proximity to each of the tires 204, 206, 208 and 210 and their corresponding RFID tags 504.

The RFID tag interrogator/reader antenna coils 600, one of which, by way of example and without limitation, may be the wheel wells of the vehicle 250, may be connected to a multiple port RFID tag interrogator/reader 610 or to one RFID tag interrogator/reader for each wheel well antenna coil 600 (not shown). The RFID tag interrogator/reader 610 is connected to the tire inflation pressure and location monitor and display (not shown) so that each tire inflation pressure may be displayed and alarm limits set. The location of each of the wireless tire inflation pressure measuring devices 510, according to this embodiment, may be easily determined by the interrogator/reader antenna coil 600 that is obtaining the tire inflation pressure information from the associated RFID tag 504 (not illustrated). No learning mode is needed and, depending upon the range of the RFID tag 504 and associated interrogator/reader antenna coil 600, revolution of the tires 204, 206, 208, 210 and 214 may not be required.

Figure 7:
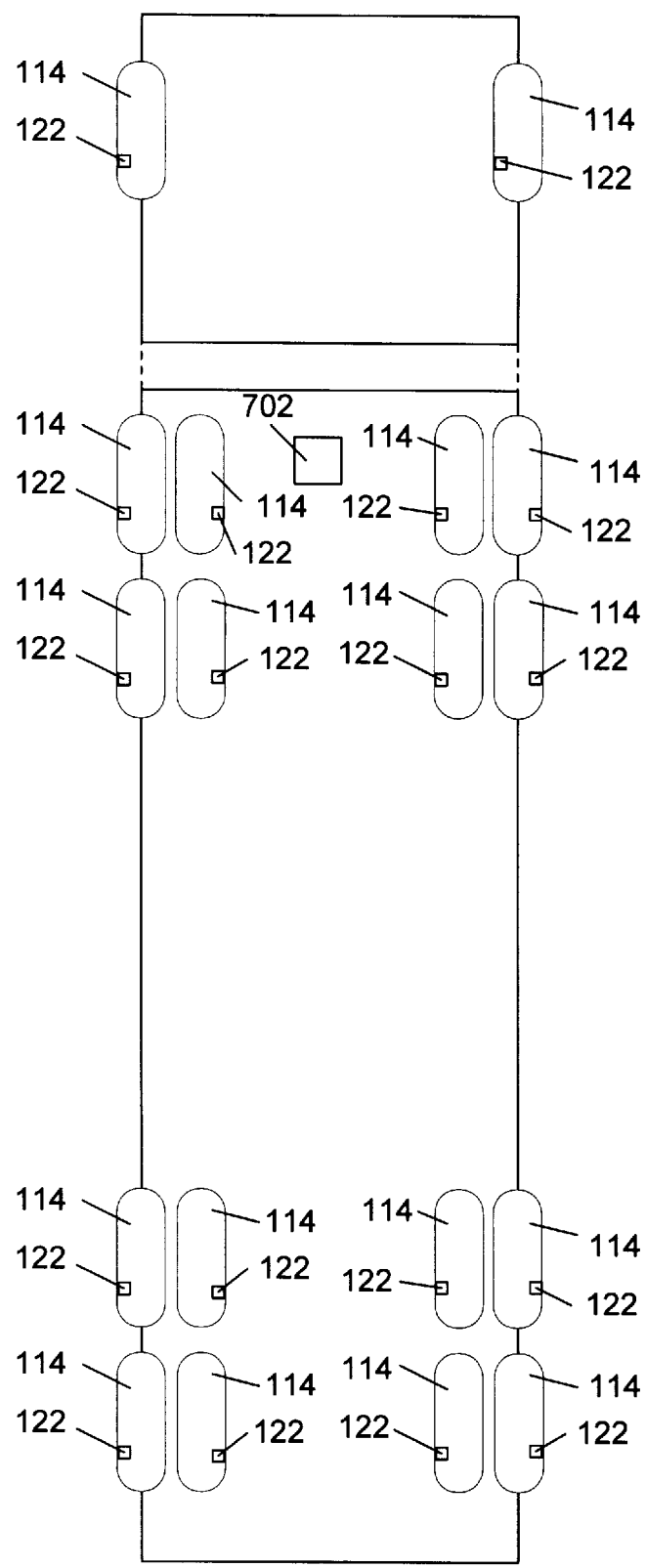
FIG. 7 illustrates a schematic plan view of a multiple axle vehicle comprising another exemplary embodiment in accordance with the present invention.

Referring to FIG. 7, a schematic plan view of a multiple axle vehicle comprising another exemplary embodiment in accordance with the present invention is illustrated. The wireless tire inflation pressure measuring device 122 may be the same as that illustrated in FIG. 1. In this embodiment, a receiver 702 having transmitted signal direction location capabilities may be used to pinpoint the source locations of the radio frequency transmissions from each of the tires 114 having a low power radio frequency transmitter 122. Once the location of each transmitter of the wireless tire inflation pressure measuring device 122 is determined, the tire inflation pressure monitor and display (not shown) may indicate tire inflation pressures and locations thereof. Such an embodiment may prove to be particularly advantageous in the case of tractor-trailer truck vehicles, which typically have up to 18 or more tires in contact with the pavement.

Figure 8:
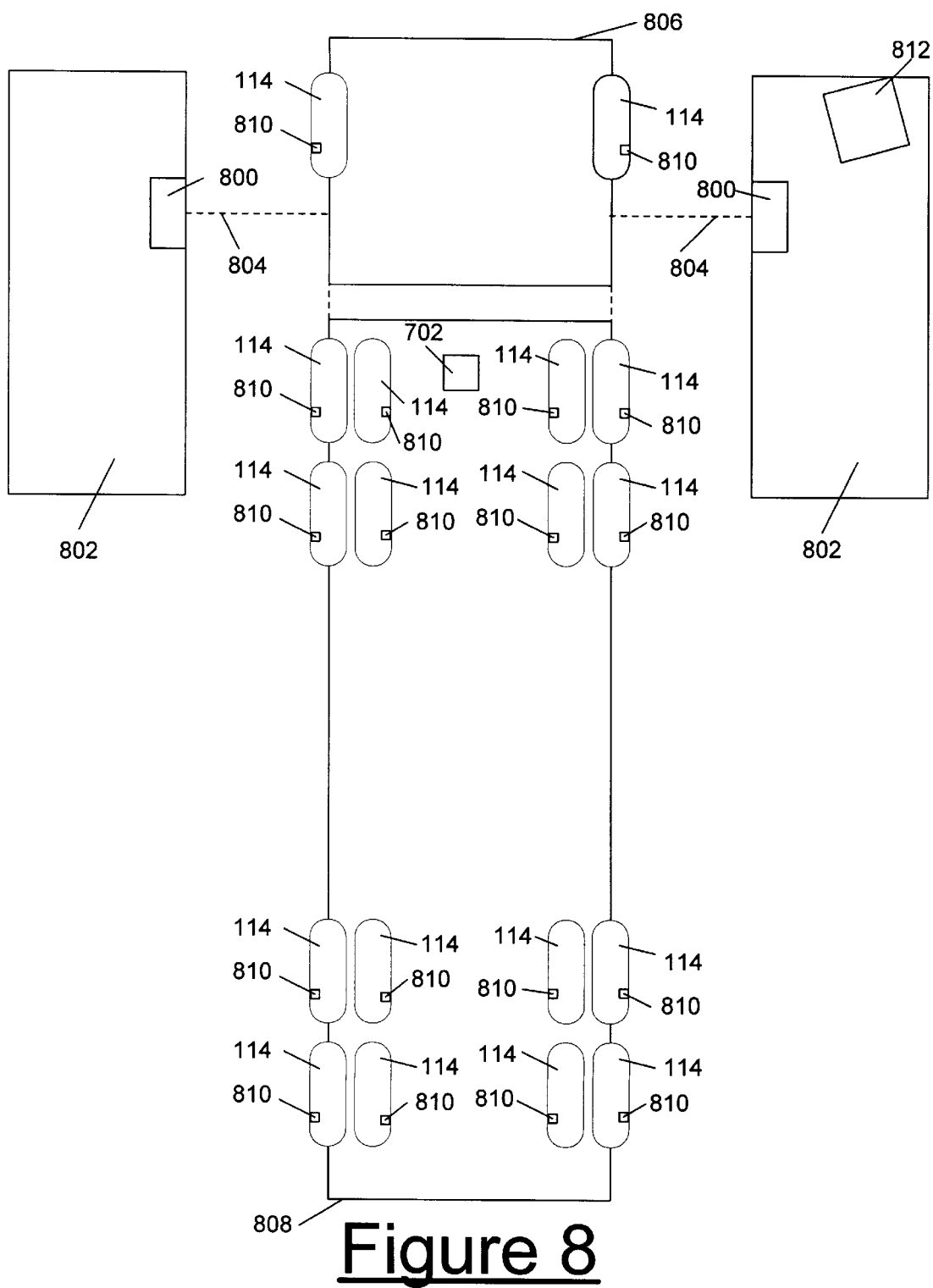
FIG. 8 illustrates a schematic plan view of a multiple axle vehicle and a toll booth or inspection station of another exemplary embodiment in accordance with the present invention.

Referring to FIG. 8, a schematic plan view of a multiple axle vehicle and a toll booth or inspection station of another exemplary embodiment in accordance with the present invention is illustrated. A vehicle has a wireless tire pressure measuring device 810 located at each of the wheel rims 113 or valve stems 112. These wireless tire pressure measuring devices 810 are adapted to be read from a toll booth and/or an inspection station 802 for vehicles such as trucks, cars, airplanes, etc. The purpose of this embodiment of the invention is to alert an individual that a dangerous tire inflation pressure condition exists.

Either low power radio frequency transmitters 122 (FIG. 1) or RFID tags (FIG. 5) may be utilized with this embodiment of the invention. An additional feature may comprise embedding an electronic serial number in the wireless tire pressure measuring device electronics so that the toll booth or inspection station 802 may catalogue or determine the owner of the vehicle having the low and/or high pressure tire which may cause a hazardous condition to occur. In the alternative or in addition, the toll booth or inspection station 802 may also use a camera 812 to take a photograph of the vehicle, occupant, and/or license plate for later determination of responsibility or liability.

A structure (fixed or moveable) having a RFID interrogator/reader antenna adapted for reading the RFID tags on a vehicle passing therethrough may be utilized for determining the presence of a low inflation pressure condition in a tire of the vehicle. An interrogator/reader 800 may be located on each side of the roadway through the toll booth or inspection station 802. The two interrogator/readers 800 may be adapted to read tire inflation pressure signals of each tire 114 on its respective side of the vehicle. The axle location of each tire 114 may be determined in sequential order when the vehicle passes through the toll booth or inspection station 802 and between the two interrogator/readers 800. A light beam or other type of object detector 804 may be used to determine the beginning presence of a vehicle body (front end) 806 and the ending presence (back end) 808. The vehicle presence detector 804 in combination with the two interrogator/readers 800, one on either side of the vehicle, may be used to determine the side and wheel axle having the tire with low inflation pressure. A warning sign may alert the driver before the vehicle leaves or travels too far from the toll booth or inspection station.

Figure 9:
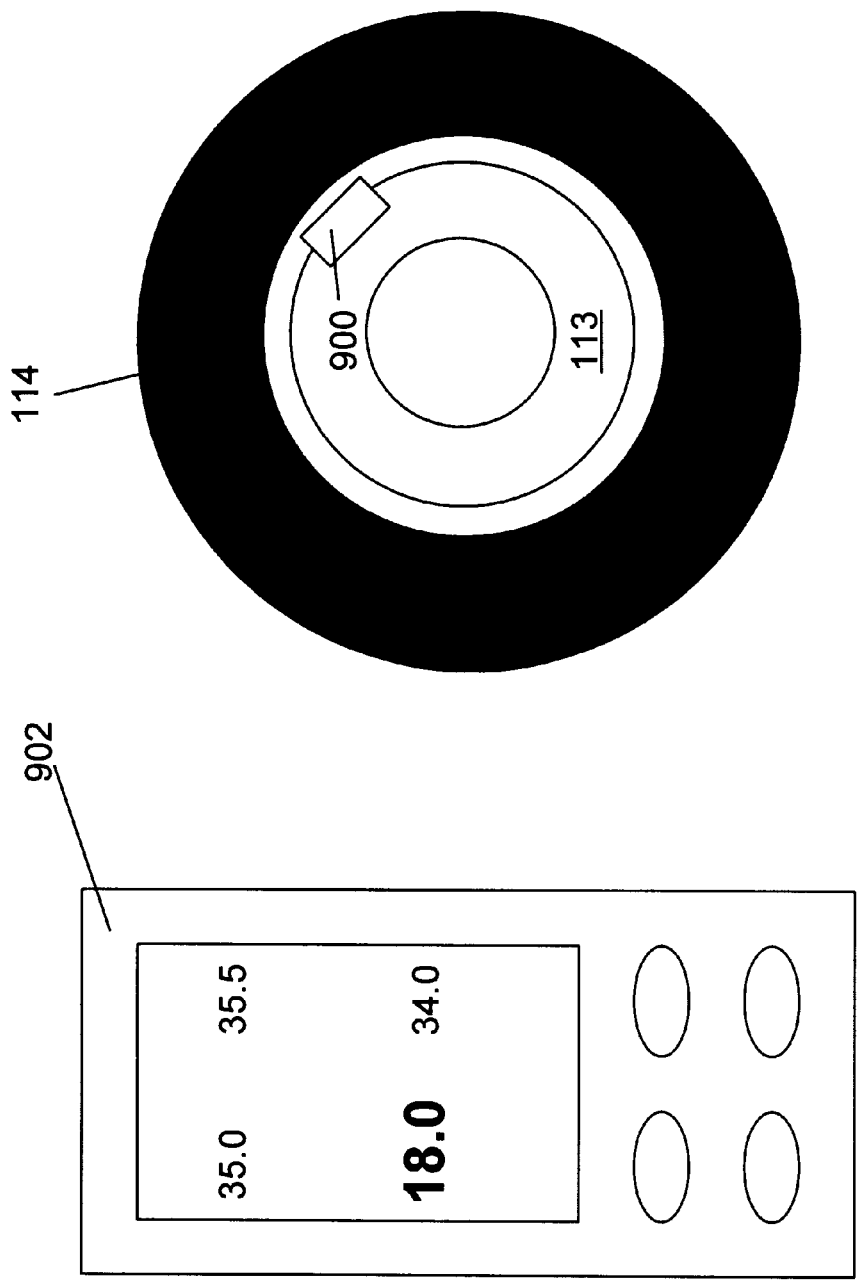
FIG. 9 illustrates a schematic diagram of an exemplary embodiment including a tire having a wireless pressure measuring device, and a pressure monitor and display in accordance with the present invention.

FIG. 9 illustrates a schematic diagram of an exemplary embodiment including a tire having a wireless pressure measuring device and a pressure monitor and display in accordance with the present invention. The wheel rim 113 may have a wireless pressure measuring device 900 attached thereto. A tire inflation pressure monitor and display 902 may have an integral receiver/interrogator/reader (not shown) that is operable to read tire inflation pressure information and an identifier for each tire 114. The tire inflation pressure monitor and display 902 may be a portable device adapted to clip onto a sun visor of the vehicle and may be easily removed from the visor and vehicle (not shown). Calibration for the location of each tire 114 may be easily accomplished by placing the tire inflation pressure monitor and display 902 into a location learning mode and manually programming the appropriate tire location based on each individual identification code of the wireless pressure measuring devices 900 associated with each tire 114. This location learning mode for determining which tire inflation pressure signal is associated with which tire 114 may be accomplished by visually determining the location of each wireless tire inflation pressure measuring device 900. It may also be accomplished by stimulating an event to each tire 114, such as by kicking the tire 114 with a shoe or by hitting the tire with a mallet, or by using relative proximity and signal strength in determining the appropriate tire location. The portable tire inflation pressure monitor and display 902 may be temporarily located in close proximity to a tire 114 and the resulting stronger radio frequency signal strength may be used to learn that tire's code once the appropriate tire location on the vehicle is entered into the monitor and display 902. Low power radio frequency transmitters, RFID tags and the like may be utilized in the wireless inflation pressure measuring device 900.

Figure 10:
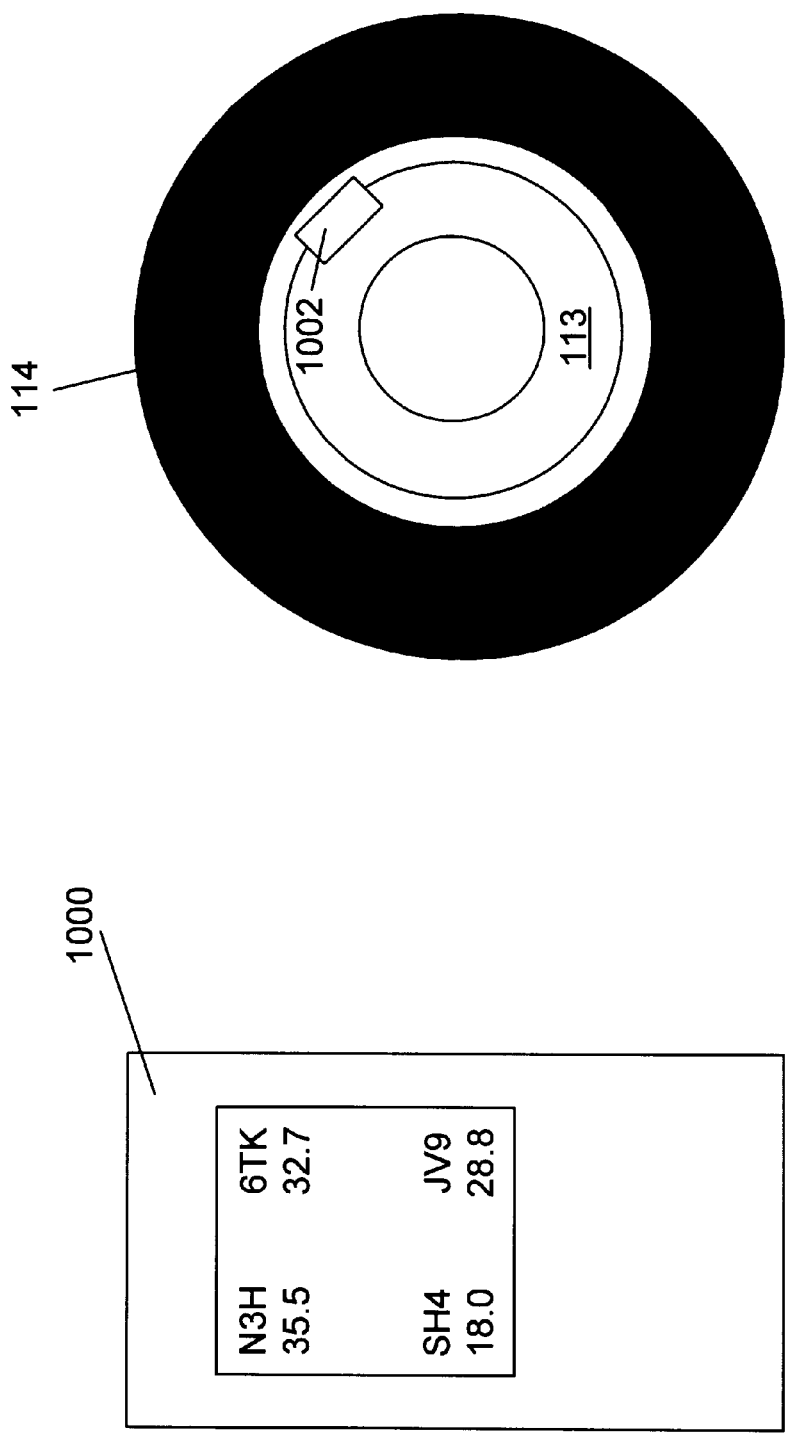
FIG. 10 illustrates a schematic diagram of an exemplary embodiment including a tire and a remote indicating electronic tire inflation pressure monitor in accordance with the present invention.

FIG. 10 illustrates a schematic diagram of an exemplary embodiment including a tire and a remote indicating electronic tire inflation pressure monitor in accordance with the present invention. The remote indicating electronic tire inflation pressure monitor 1000 may be used to alarm on an undesired tire inflation pressure condition and/or give relative tire pressures. The inflation pressure monitor 1000 may display each of the tire inflation pressures with associated code symbols such as letters and/or numbers. When an undesirable tire inflation pressure "event" occurs the inflation pressure monitor 1000 can alert the driver, who may then stop the vehicle and locate the indicated code symbol on the problem tire 114. In accordance with one embodiment, a wireless tire pressure measuring device 1002 may be provided that is adapted for easy and quick attachment to existing tire valve stems. This embodiment of the invention thus may be applicable for aftermarket addition to any type of vehicle tire 114, and allows a quick and inexpensive solution to monitoring tire inflation pressures and easily locating the problem tire 114 on vehicles not heretofore having this capability. Low power radio frequency transmitters, RFID tags and the like may be utilized in the wireless inflation pressure measuring device 1002.

Figure 11:
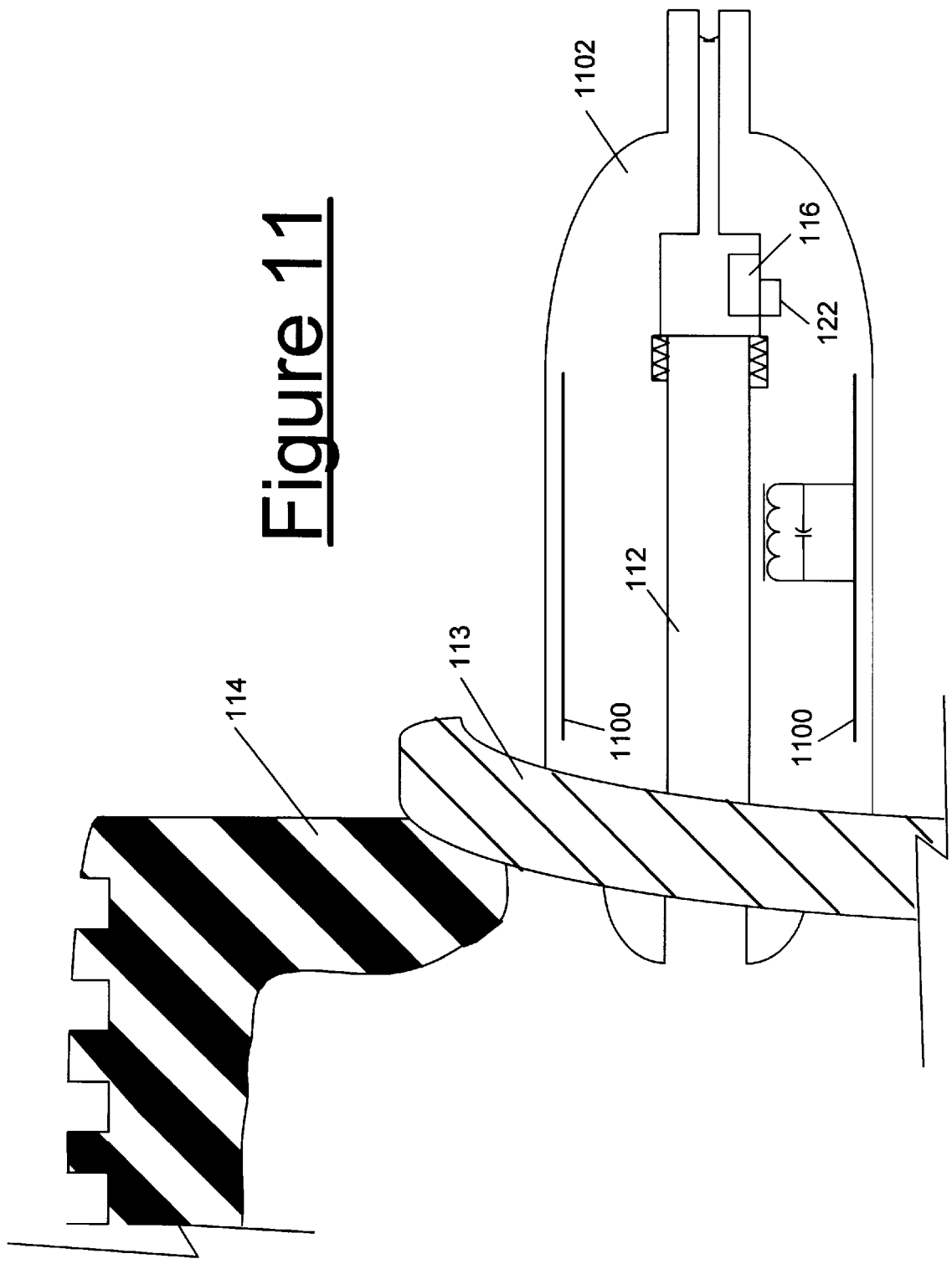
FIG. 11 illustrates a schematic diagram of an exemplary embodiment including a wireless tire inflation pressure measuring device for attachment to a tire air valve stem in accordance with the present invention.

FIG. 11 illustrates a schematic diagram of an exemplary embodiment including a wireless tire inflation pressure measuring device 1102 adapted to attach to a tire's existing air valve stem 112, in accordance with the present invention. It is contemplated and within the scope of the invention that the wireless tire pressure measuring device may also be built into, disposed at or proximate to the tire 114 or wheel rim. The wireless tire inflation pressure measuring device 1102 may comprise a pressure sensor 116, an electronic circuit (not shown) for converting the pressure signal from the pressure sensor 116 to an electronic information signal, a low power radio frequency transmitter 122 that is adapted to transmit the electronic information signal on a radio frequency signal, an antenna/electromagnetic coil 1100 connected to the low power radio frequency transmitter 122 which is adapted to radiate the radio frequency signal and to power the frequency transmitter using, e.g., the embodiment illustrated in FIG. 12.

The pressure sensor 116 may be any type of pressure sensor which converts a pressure input to an electronic pressure signal output. The electronic circuit may be an analog or digital encoder/modulator that is adapted to modulate the low power radio frequency transmitter 122 with information containing the electronic pressure signal and some type of identifier. The identifier may be used to associate a tire with inflation pressure information. The identifier may be a tone or subcarrier being modulated by the electronic pressure signal in the case of analog modulation. For digital modulation, the identifier may be, by way of example and without limitation, a digital code which is part of a digital modulation code word containing both the identifier and a digital representation of the electronic pressure signal.

Figure 12:
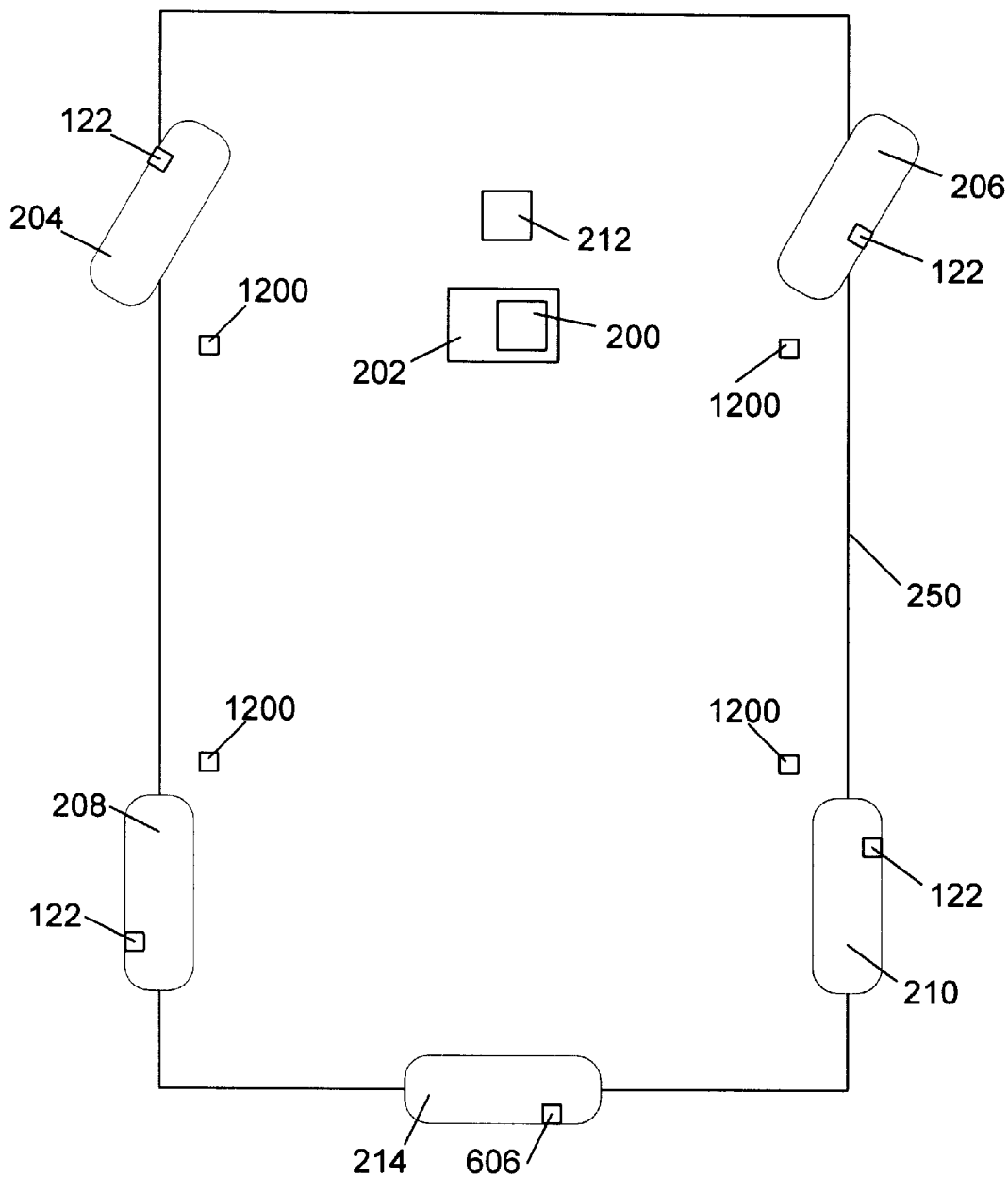
FIG. 12 illustrates a schematic plan view of another exemplary embodiment employing electromagnetic field power generation in accordance with the present invention.

Referring to FIG. 12, a schematic plan view of another exemplary embodiment employing electromagnetic field power generation in accordance with the present invention is illustrated. An advantage of this embodiment is that it requires no self-contained battery for operation thereof. Instead of receiving power from a self-contained battery, low power radio frequency transmitter 122 obtains operating power via the antenna coil motion through an electromagnetic field created by a fixed magnet 1200 in the wheel well, as the wheel turns. In this embodiment of the invention, a fixed magnet 1200 may be placed in or proximate to each wheel well of the vehicle.

Low power radio frequency transmitters 122, one for each tire, advantageously are adapted to transmit a radio frequency carrier signal containing the identifier and electronic pressure signal to a radio frequency receiver 200 which is part of the tire inflation pressure monitor 202 inside of the vehicle 250. The antenna (shown, e.g., in FIG. 1) is oriented on tires 204, 206, 208, and 210 such that the signal strength of the transmitted radio frequency signal at the radio frequency receiver 200 varies as the tires rotate. Thus, the rotation of a tire (changing antenna orientation) amplitude modulates the carrier of the transmitted radio frequency signal at the rotational rate of the tire. One rotation of the tire will produce one amplitude variation cycle of the radio frequency carrier. This amplitude variation (modulation) may be detected so as to determine the rotational speed of each tire. See also the embodiments described more fully herein, e.g., FIG. 1.

Figure 13:
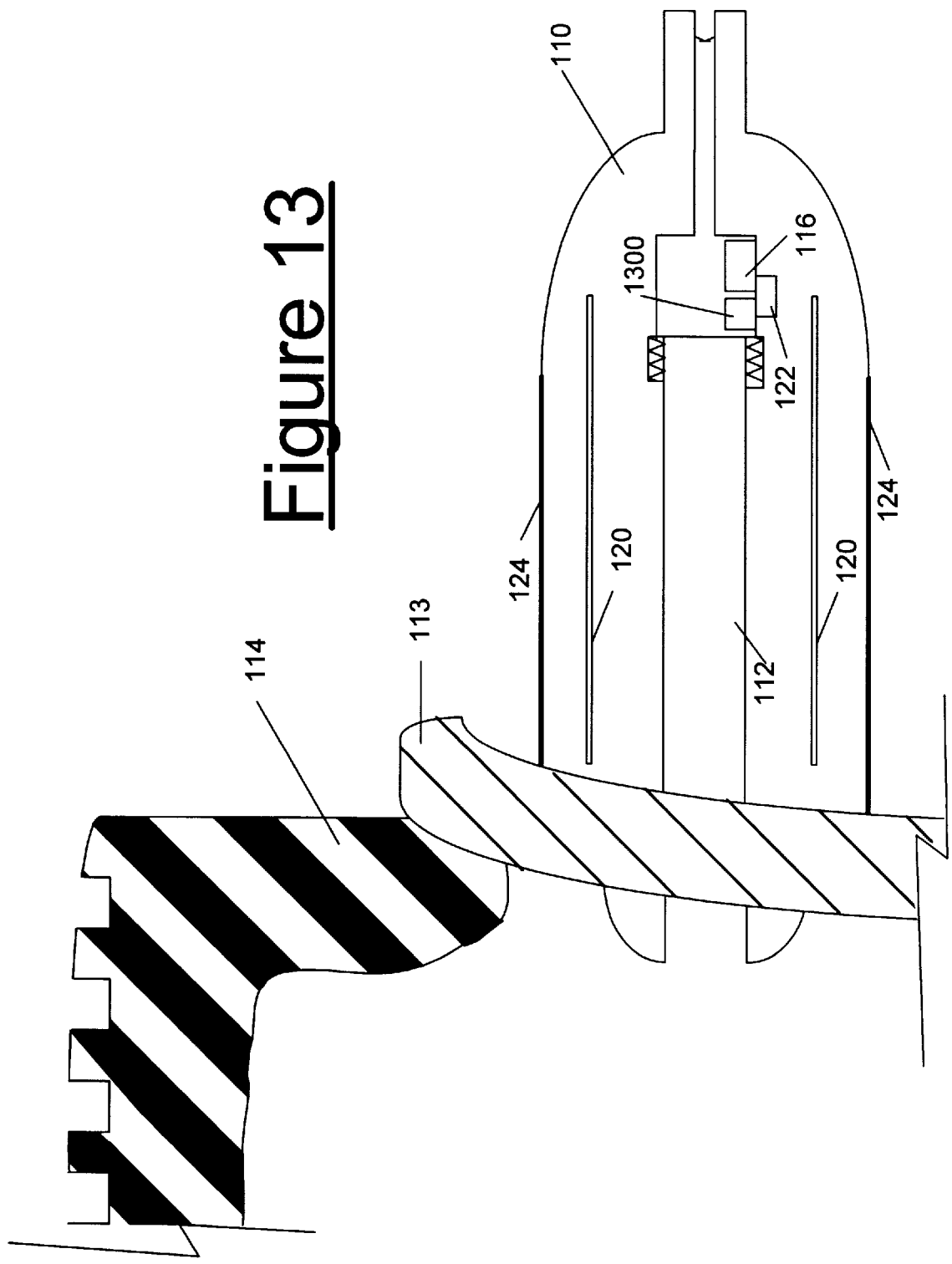
FIG. 13 illustrates a schematic diagram of another exemplary embodiment including a wireless tire inflation pressure measuring device adapted for attachment to a tire air valve stem in accordance with the present invention.

FIG. 13 illustrates a schematic diagram of another exemplary embodiment including a wireless tire inflation pressure measuring device 110 adapted to attach to a tire's existing air valve stem 112, in accordance with the present invention. It is contemplated and within the scope of the invention that the wireless tire pressure measuring device may also be built into, disposed at, proximate to, or otherwise accompany the tire 114 or wheel rim. The wireless tire inflation pressure measuring device 110 may comprise a pressure sensor 116, a temperature sensor 1300, an electronic circuit (not shown) for converting the pressure signal from the pressure sensor 116 to an electronic information signal, a low power radio frequency transmitter 122 that is adapted to transmit the electronic information signal on a radio frequency signal, an antenna 124 connected to the low power radio frequency transmitter 122 which is adapted to radiate the radio frequency signal, and a battery 120 to power the low power radio frequency transmitter 122 and electronic circuit. The temperature sensor 1300 of this embodiment may be utilized for better interpretation of the pressure sensor 116 information over a wide operating temperature range of the tire.

The pressure sensor 116 may be any type of pressure sensor which converts a pressure input to an electronic pressure signal output. The electronic circuit may be an analog or digital encoder/modulator that is adapted to modulate the low power radio frequency transmitter 122 with information containing the electronic pressure signal and some type of identifier. The identifier may be used to associate a tire with inflation pressure information. The identifier may be a tone or subcarrier being modulated by the electronic pressure signal in the case of analog modulation. For digital modulation, the identifier may be, by way of example and without limitation, a digital code which is part of a digital modulation code word containing both the identifier and a digital representation of the electronic pressure signal.

Any of the embodiments of the invention described herein may further be beneficial by generating an alert signal when a tire pressure is at a desired pressure value, and/or when the tire pressure has exceeded a maximum value. For example, when adding air to a tire, the alert signal, e.g., audible-horn chirp(s), tone(s) from a speaker, or visual-lights flashing, may be used to alert the person adding air to the tire that the tire pressure has reached a desired value. Another alert signal could also be used to alert when the inflation pressure has exceeded a maximum value. This feature would eliminate the need to measure tire pressure with a tire pressure gauge, either during or after filing the tire with air. Also, safer, faster and more accurate tire inflation would be achieved because there is no requirement for having to read a tire pressure gauge in the rain, fog, or poor light conditions.

Any of the embodiments of the invention described herein may also be beneficial by encrypting the tire inflation pressure signal so that false inflation pressure cannot be substituted by a criminal or prankster for the actual tire inflation pressure. Otherwise, a car-jacker might be able to follow the vehicle, record the tire inflation pressure signals and substitute false inflation pressure signals that could overcome the actual inflation pressure transmitter signals. This could be used to cause a false inflation pressure alarm with the intention of causing the driver of the vehicle to stop so as to examine or change the apparently faulty tire, providing, e.g., an opportunity for the car-jacker to confiscate the vehicle.

A secure encryption scheme using, by way of example and without limitation, a rolling code may be effectively incorporated to prevent false pressure signal infiltration. Security and encryption systems describing technologies useful for this purpose are more fully described in commonly owned U.S. Pat. No. 5,686,904, entitled "Secure Self Learning System" by Frederick Bruwer; U.S. Pat. No. 5,675,622, entitled "Method and Apparatus for Electronic Encoding and Decoding" by Bruwer, et al.; U.S. Pat. No. 5,517,187, entitled "Microchips and Remote Control Devices Comprising Same" by Bruwer, et al.; Patent Application Ser. No. 07/985,929, entitled "Encoder and Decoder Microchips and Remote Control Devices for Secure Unidirectional Communications" by Bruwer, et al.; Ser. No. 09/074,730, entitled "System for Encoded RF and Encoded Magnetic Field Communication and Method Therefor" by Bruwer, et al.; and Ser. No. 09/672,484, entitled "Encoder and Decoder Microchips and Remote Control Devices for Secure Unidirectional Communication" by Bruwer, et al., all hereby incorporated by reference herein for all purposes. Features of these security systems and their related technology may be used as features of alternative embodiments of the present invention.

The invention, therefore, is well adapted to carry out the objects and attain the ends and advantages mentioned, as well as others inherent therein. While the invention has been depicted, described, and is defined by reference to particular exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for determining inflation pressures of tires and locations thereof on wheels of a vehicle, said method comprising the steps of:

providing a wireless inflation pressure measuring device for each wheel of a vehicle, each of the wireless inflation pressure measuring devices has an antenna located toward an outer perimeter of a respective one of the wheels, wherein each of the wireless inflation pressure measuring devices transmits from its respective antenna a radio frequency signal comprising inflation pressure information of a tire mounted on the respective one of the wheels;

providing an inflation pressure monitor having a radio frequency receiver adapted for receiving the radio frequency signals from each of the inflation pressure measuring devices, whereby an amplitude of each of the received radio frequency signals varies periodically with each rotation of the respective one of the wheels;

determining a rotation speed of each of the wheels by detecting the periodic amplitude variations of each of the radio frequency signals as the respective ones of the wheels rotate;

detecting when the vehicle turns and the relative direction thereof, determining relative wheel rotation speeds; and assigning a location to each of the wheels based on the relative wheel rotation speeds and vehicle turning direction.

2. The method of claim 1, wherein the step of assigning a location to each of the wheels when the vehicle is making a right turn and going forward, comprises the steps of:

assigning a left front wheel location to the wheel having the fastest relative wheel rotation speed;

assigning a left rear wheel location to the wheel having the second fastest relative wheel rotation speed;

assigning a right front wheel location to the wheel having the third fastest relative wheel rotation speed; and assigning a right rear wheel location to the wheel having the slowest relative wheel rotation speed.

3. The method of claim 1, wherein the step of assigning a location to each of the wheels when the vehicle is making a left turn and going forward, comprises the steps of:

assigning a right front wheel location to the wheel having the fastest relative wheel rotation speed;

assigning a right rear wheel location to the wheel having the second fastest relative wheel rotation speed;

assigning a left front wheel location to the wheel having the third fastest relative wheel rotation speed; and assigning a left rear wheel location to the wheel having the slowest relative wheel rotation speed.

4. The method of claim 1, wherein the step of assigning a location to each of the wheels when the vehicle is making a left turn and going backward, comprises the steps of:

assigning a left front wheel location to the wheel having the fastest relative wheel rotation speed;

assigning a left rear wheel location to the wheel having the second fastest relative wheel rotation speed;

assigning a right front wheel location to the wheel having the third fastest relative wheel rotation speed; and assigning a right rear wheel location to the wheel having the slowest relative wheel rotation speed.

5. The method of claim 1, wherein the step of assigning a location to each of the wheels when the vehicle is making a right turn and going backward, comprises the steps of:

assigning a right front wheel location to the wheel having the fastest relative wheel rotation speed;

assigning a right rear wheel location to the wheel having the second fastest relative wheel rotation speed;

assigning a left front wheel location to the wheel having the third fastest relative wheel rotation speed; and assigning a left rear wheel location to the wheel having the slowest relative wheel rotation speed.

6. The method of claim 1, further comprising the step of encrypting the tire inflation pressure information.

7. The method of claim 1, further comprising the steps of:
providing a temperature sensor coupled to the wireless inflation pressure measuring device; and
measuring tire temperature with the temperature sensor, wherein the radio frequency signal further comprises tire temperature information.

8. The method of claim 7, further comprising the step of calculating a tire pressure value of each tire of the vehicle based upon the respective tire temperature and pressure.

9. The method of claim 1, wherein the step of determining the relative direction of the vehicle is obtained from the vehicle odometer.

10. The method of claim 1, wherein the step of determining the relative direction of the vehicle is obtained from the vehicle transmission.

11. The method of claim 1, wherein the step of determining the relative direction of the vehicle is obtained from an accelerometer.

12. The method of claim 1, wherein the step of determining when the vehicle turns is obtained from limit switches on the vehicle steering column.

13. The method of claim 1, wherein the step of determining when the vehicle turns is obtained from a gyroscopic device.

14. The method of claim 1, wherein the step of determining when the vehicle turns is obtained from a compass.

15. The method of claim 1, wherein the step of determining when the vehicle turns is obtained from turn signals.

16. The method of claim 1, further comprising the step of transmitting with the radio frequency signal an identifier for each of the wheels.

17. The method of claim 16 further comprising the step of assigning each identifier to a respective wheel location.

18. The method of claim 1, further comprising the step of generating an alert signal when a tire pressure is less than a minimum pressure.

19. The method of claim 1, further comprising the step of generating an alert signal when a tire pressure is greater than a maximum pressure.

20. A method for determining inflation pressures of tires and locations thereof on wheels of a vehicle, said method comprising the steps of:
providing a wireless inflation pressure measuring device for each wheel of a vehicle, each of the wireless inflation pressure measuring devices has an antenna located toward an outer perimeter of a respective one of the wheels, wherein each of the wireless inflation pressure measuring devices transmits from its respective antenna a radio frequency signal comprising inflation pressure information of a tire mounted on the respective one of the wheels;
providing an inflation pressure monitor having a radio frequency receiver adapted for receiving the radio frequency signals from each of the inflation pressure measuring devices, whereby an amplitude of each of the received radio frequency signals varies periodically with each rotation of the respective one of the wheels;
determining rotation speeds of each of the vehicle wheels by detecting the periodic amplitude variations of each of the radio frequency signals as the respective ones of the vehicle wheels rotate;
detecting a position of the vehicle front wheels relative to an axis along the length of the vehicle as viewed facing the front of the vehicle;
determining relative wheel rotation speeds; and
assigning a location to each of the wheels based on the relative wheel rotation speeds and the position of the vehicle front wheels relative to an axis along the length of the vehicle as viewed facing the front of the vehicle.

21. The method of claim 20, wherein the step of assigning a location to each of the wheels when the position of the vehicle front wheels are to the right of the axis as viewed facing the front of the vehicle, comprises the steps of:
assigning a left front wheel location to the wheel having the fastest relative wheel rotation speed;
assigning a left rear wheel location to the wheel having the second fastest relative wheel rotation speed;
assigning a right front wheel location to the wheel having the third fastest relative wheel rotation speed; and
assigning a right rear wheel location to the wheel having the slowest relative wheel rotation speed.

22. The method of claim 20, wherein the step of assigning a location to each of the wheels when the position of the vehicle front wheels are to the left of the axis as viewed facing the front of the vehicle, comprises the steps of:
assigning a right front wheel location to the wheel having the fastest relative wheel rotation speed;
assigning a right rear wheel location to the wheel having the second fastest relative wheel rotation speed;
assigning a left front wheel location to the wheel having the third fastest relative wheel rotation speed; and
assigning a left rear wheel location to the wheel having the slowest relative wheel rotation speed.

23. The method of claim 20, further composing the step of encrypting the inflation pressure information.

24. The method of claim 20, further comprising the steps of:
providing a temperature sensor coupled to the wireless inflation pressure measuring device; and
measuring tire temperature with the temperature sensor, wherein the radio frequency signal further comprises tire temperature information.

25. The method of claim 24, further comprising the step of calculating a tire pressure value of each ire of the vehicle based upon the respective tire temperature and pressure.

26. The method of claim 20, further comprising the step of transmitting with the radio frequency signal an identifier for each of the wheels.

27. The method of claim 26, further comprising the step of assigning each identifier to a respective wheel location.

28. The method of claim 20, further comprising the step of generating an alert signal when a tire pressure is less than a minimum pressure.

29. The method of claim 20, further comprising the step of generating an alert signal when a tire pressure is greater than a maximum pressure.

30. An apparatus for determining inflation pressures of tires and locations thereof on wheels of a vehicle, comprising:
a wireless inflation pressure measuring device for each wheel of a vehicle, each of the wireless inflation pressure measuring devices has an antenna located toward an outer perimeter of a respective one of the wheels, wherein each of the wireless inflation pressure measuring devices transmits from its respective antenna a radio frequency signal comprising inflation pressure information of a tire mounted on the respective one of the wheels;
an inflation pressure monitor having a radio frequency receiver adapted for receiving the radio frequency signals from each of the inflation pressure measuring devices, whereby an amplitude of each of the received radio frequency signals varies periodically with each rotation of the respective one of the vehicle wheels;

a vehicle turn sensor for determining in which direction the vehicle is making a turn;

a vehicle relative direction sensor for determining a relative direction in which the vehicle is moving;

an amplitude demodulator circuit connected to the radio frequency receiver and adapted for detecting the periodic amplitude variations of each of the radio frequency signals as the respective ones of the vehicle wheels rotate, whereby rotation speeds of each of the wheels may be determined; and a logic circuit connected to the vehicle turn and relative direction sensors and the amplitude demodulator circuit, wherein the logic circuit determines wheel locations based on the relative wheel rotation speeds, the relative direction of the vehicle movement, and the direction the vehicle is making the turn;

wherein when the vehicle is making a right turn and going forward
the left front wheel has the fastest rotation speed,
the left rear wheel has the second fastest rotation speed,
the right front wheel has the third fastest rotation speed, and
the right rear wheel has the slowest rotation speed;

wherein when the vehicle is making a left turn and going forward
the right front wheel has the fastest rotation speed,
the right rear wheel has the second fastest rotation speed,
the left front wheel has the third fastest rotation speed, and
the left rear wheel has the slowest rotation speed;

wherein when the vehicle is making a left turn and going backward:
the left front wheel has the fastest rotation speed,
the left rear wheel has the second fastest rotation speed,
the right front wheel has the third fastest rotation speed, and
the right rear wheel has the slowest rotation speed; and wherein when the vehicle is making a right turn and going backward
the right front wheel has the fastest rotation speed,
the right rear wheel has the second fastest rotation speed,
the left front wheel has the third fastest rotation speed, and
the left rear wheel has the slowest rotation speed.

31. The apparatus of claim 30, further comprising an encryption circuit for encrypting the tire inflation pressure information.

32. The apparatus of claim 30, further comprising:
a tire temperature sensor coupled to the wireless inflation pressure measuring device for measuring tire temperature, wherein the radio frequency signal contains tire temperature information.

33. The apparatus of claim 30, further comprising an alert signal when a tire pressure is less than a minimum pressure.

34. The apparatus of claim 30, further comprising an alert signal when a tire pressure is greater than a maximum pressure.

35. An apparatus for determining inflation pressures of tires and locations thereof on wheels of a vehicle, comprising:

a wireless inflation pressure measuring device for each wheel of a vehicle, each of the wireless inflation pressure measuring devices has an antenna located toward an outer perimeter of a respective one of the wheels, wherein each of the wireless tire inflation pressure measuring devices transmits from its respective antenna a radio frequency signal comprising inflation pressure information of a tire mounted on the respective one of the wheels;

an inflation pressure monitor having a radio frequency receiver adapted for receiving the radio frequency signals from each of the inflation pressure measuring devices, whereby an amplitude of each of the received radio frequency signals varies periodically with each rotation of the respective one of the vehicle wheels;

a vehicle front wheel position sensor for determining a position of the front wheels relative to an axis along the length of the vehicle as viewed facing the front of the vehicle;

an amplitude demodulator circuit connected to the radio frequency receiver and adapted for detecting the periodic amplitude variations of each of the radio frequency signals as the respective ones of the vehicle wheels rotate, whereby wheel rotation speed of each of the wheels may be determined; and a logic circuit connected to the vehicle front wheel position sensor and the amplitude demodulator circuit, wherein the logic circuit determines relative wheel rotation speeds and assigns a wheel location to each of the wheels based on the relative wheel rotation speeds and the position of the vehicle front wheels determined by the vehicle front wheel position sensor;

wherein when the position of the vehicle front wheels are to the right of the axis as viewed facing the front of the vehicle
the left front wheel has the fastest rotation speed,
the left rear wheel has the second fastest rotation speed,
the right front wheel has the third fastest rotation speed, and
the right rear wheel has the slowest rotation speed; and wherein when the position of the vehicle front wheels are to the left of the axis as viewed facing the front of the vehicle
the right front wheel has the fastest rotation speed,
the right rear wheel has the second fastest rotation speed,
the left front wheel has the third fastest rotation speed, and
the left rear wheel has the slowest rotation speed.

36. The apparatus of claim 35, further comprising an encryption circuit for encrypting the tire inflation pressure information.

37. The apparatus of claim 35, further comprising a temperature sensor coupled to the wireless inflation pressure measuring device, wherein the radio frequency signal further comprises tire temperature information.

38. The apparatus of claim 35, further comprising an alert signal when a tire pressure is less than a minimum pressure.

39. The apparatus of claim 35, further comprising an alert signal when a tire pressure is greater than a maximum pressure.

* * * * *